United States Patent
Finley et al.

(10) Patent No.: US 12,497,276 B2
(45) Date of Patent: Dec. 16, 2025

(54) AUTONOMOUS LOAD MOVING ELECTRIC VEHICLE

(71) Applicant: Moog Inc., East Aurora, NY (US)

(72) Inventors: Luke G. Finley, Hamburg, NY (US); John C. Layer, East Aurora, NY (US); Thomas J. Greier, Elma, NY (US); Mark J. Underhill, West Falls, NY (US)

(73) Assignee: Moog Inc., East Aurora, NY (US)

( * ) Notice: Subject to any disclaimer, the term of this patent is extended or adjusted under 35 U.S.C. 154(b) by 175 days.

(21) Appl. No.: 18/572,634

(22) PCT Filed: Jun. 28, 2022

(86) PCT No.: PCT/US2022/035393
§ 371 (c)(1),
(2) Date: Dec. 20, 2023

(87) PCT Pub. No.: WO2023/278496
PCT Pub. Date: Jan. 5, 2023

(65) Prior Publication Data
US 2024/0336463 A1    Oct. 10, 2024

Related U.S. Application Data

(60) Provisional application No. 63/356,015, filed on Jun. 27, 2022, provisional application No. 63/215,823, filed on Jun. 28, 2021.

(51) Int. Cl.
*B66F 9/075*    (2006.01)
*B66F 9/06*    (2006.01)

(52) U.S. Cl.
CPC .......... *B66F 9/07581* (2013.01); *B66F 9/063* (2013.01)

(58) Field of Classification Search
CPC .............................. B66F 9/07581; B66F 9/063
See application file for complete search history.

(56) References Cited

U.S. PATENT DOCUMENTS 9,796,435 B1    10/2017    Reyes et al.
10,106,321 B2    10/2018    Otto et al.
(Continued)

FOREIGN PATENT DOCUMENTS

CN    211920783 U    11/2020
CN    112875577 A    6/2021
(Continued)

OTHER PUBLICATIONS

Pepperl&Fuchs Group (2014) "How to: How Do I Set the Series L2 Ultrasonic Switch Points Using the Programming Button?," YouTube video accessed online at https://www.youtube.com/watch?v=pyvuOvsw3uk, 6 pages.
(Continued)

*Primary Examiner* — Mathew Franklin Gordon
(74) *Attorney, Agent, or Firm* — Harter Secrest & Emery LLP

(57) ABSTRACT

An autonomous vehicle and navigation system, including a chassis, a propulsor arranged to drive the chassis, wherein the propulsor is operably connected with an electric power source, a load bearing dynamic platform operable to translate vertically, and a controller operable to receive and transmit signals, wherein the controller is operable to control the propulsor. Wherein the controller is operable to navigate an environment utilizing one or more pre-planned routes in an automated guidance mode as a function of guidance from a global controller, and the controller is operable to navigate the environment utilizing signals from a remote control in a localized remote guidance mode.

22 Claims, 16 Drawing Sheets

(56) References Cited

U.S. PATENT DOCUMENTS

| | | |
|---|---|---|
| 10,421,609 B2 | 9/2019 | Otto et al. |
| 10,538,421 B2 | 1/2020 | Blevins et al. |
| 10,543,983 B2 | 1/2020 | Otto et al. |
| 10,683,171 B2 | 6/2020 | Jarvis et al. |
| 10,800,607 B2 | 10/2020 | Otto et al. |
| 10,815,059 B2 | 10/2020 | Otto et al. |
| 11,097,896 B2 | 8/2021 | Otto et al. |
| 11,104,514 B2 | 8/2021 | Cheng et al. |
| 11,142,413 B2 | 10/2021 | Hoofard et al. |
| 11,273,982 B2 | 3/2022 | Haveman et al. |
| 11,305,936 B2 | 4/2022 | Sullivan et al. |
| 11,370,643 B2 | 6/2022 | Hasegawa et al. |
| 11,427,448 B2 | 8/2022 | Nagasawa |
| 11,511,981 B2 | 11/2022 | Marshall et al. |
| 11,572,261 B2 | 2/2023 | Bangalore et al. |
| 11,623,706 B2 | 4/2023 | Finke |
| 11,655,099 B2 | 5/2023 | Cheng et al. |
| 11,702,287 B2 | 7/2023 | Jarvis et al. |
| 11,718,472 B2 | 8/2023 | Cheng et al. |
| 11,794,995 B2 | 10/2023 | Cheng et al. |
| 11,884,196 B2 | 1/2024 | Zhang |
| 11,897,693 B2 | 2/2024 | Otto et al. |
| 11,981,554 B2 | 5/2024 | Cord et al. |
| 12,037,195 B2 | 7/2024 | Jarvis et al. |
| 12,098,062 B2 | 9/2024 | Henderson |
| 12,103,771 B2 | 10/2024 | Cheng et al. |
| 12,103,833 B2 | 10/2024 | Pina et al. |
| 12,153,431 B2 | 11/2024 | Zhang et al. |
| 12,227,218 B1 | 2/2025 | Clarke et al. |
| 12,227,401 B2 | 2/2025 | Zahdeh et al. |
| 12,264,050 B2 | 4/2025 | Johansson et al. |
| 2012/0191272 A1 | 7/2012 | Andersen et al. |
| 2020/0393839 A1 | 12/2020 | Hasegawa et al. |
| 2022/0379792 A1 | 12/2022 | Wehner et al. |
| 2023/0050980 A1 | 2/2023 | Zahdeh et al. |
| 2024/0025716 A1 | 1/2024 | Wang et al. |
| 2024/0067510 A1 | 2/2024 | Ulbrich et al. |
| 2025/0109002 A1 | 4/2025 | Anderson-Sprecher et al. |
| 2025/0181081 A1 | 6/2025 | Panzarella et al. |
| 2025/0187887 A1 | 6/2025 | Zahdeh et al. |

FOREIGN PATENT DOCUMENTS

| | | |
|---|---|---|
| EP | 2668623 A2 | 12/2013 |
| EP | 3452402 A2 | 3/2019 |
| EP | 3489190 A1 | 5/2019 |
| EP | 3574382 A1 | 12/2019 |
| EP | 3753898 A1 | 12/2020 |
| EP | 3918433 A1 | 12/2021 |
| EP | 4222102 A1 | 8/2023 |
| EP | 4242139 A2 | 9/2023 |
| EP | 4306478 A2 | 1/2024 |
| EP | 4384470 A1 | 6/2024 |
| EP | 4500446 A1 | 2/2025 |
| EP | 3856620 B1 | 3/2025 |
| EP | 4545908 A2 | 4/2025 |
| EP | 4118507 B1 | 5/2025 |
| KR | 20150098508 A | 8/2015 |
| WO | 2019178299 A1 | 9/2019 |
| WO | 2024042534 A1 | 2/2024 |
| WO | 2025087655 A1 | 5/2025 |

OTHER PUBLICATIONS

Tiusanen et al. (Jul. 2020) "An overview of current safety requirements for autonomous machines," Open Engineering 10(1): 665-673.

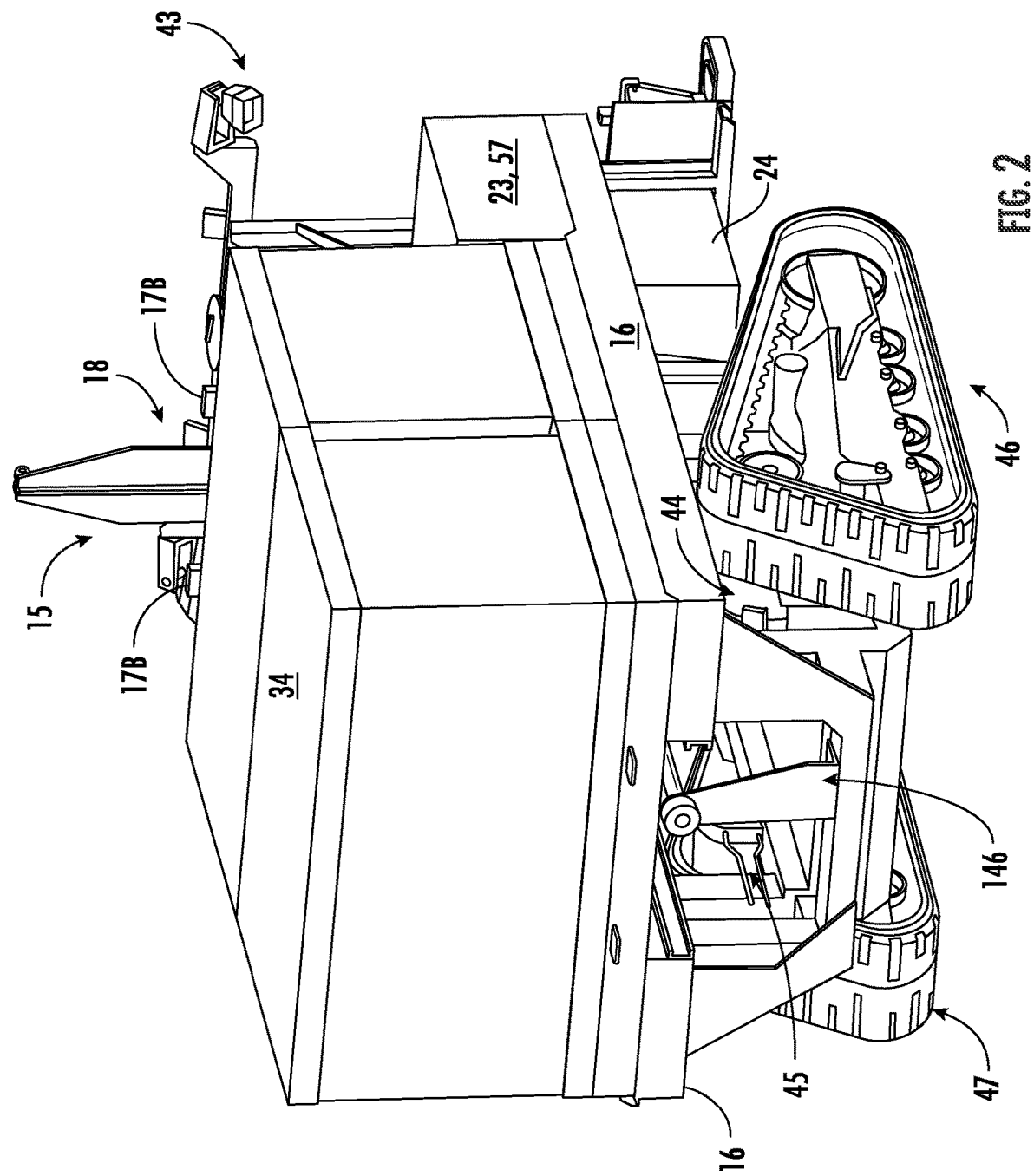

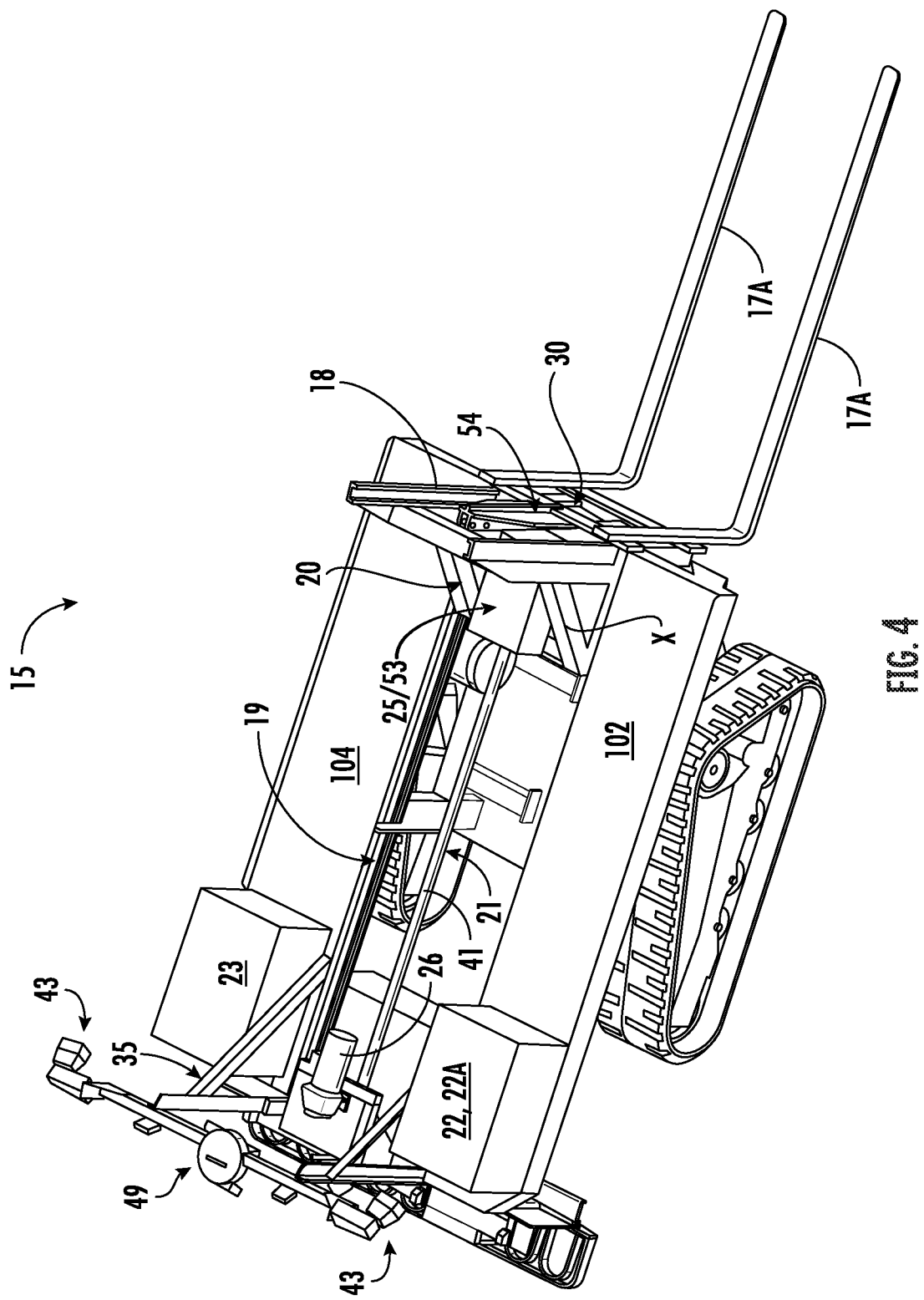

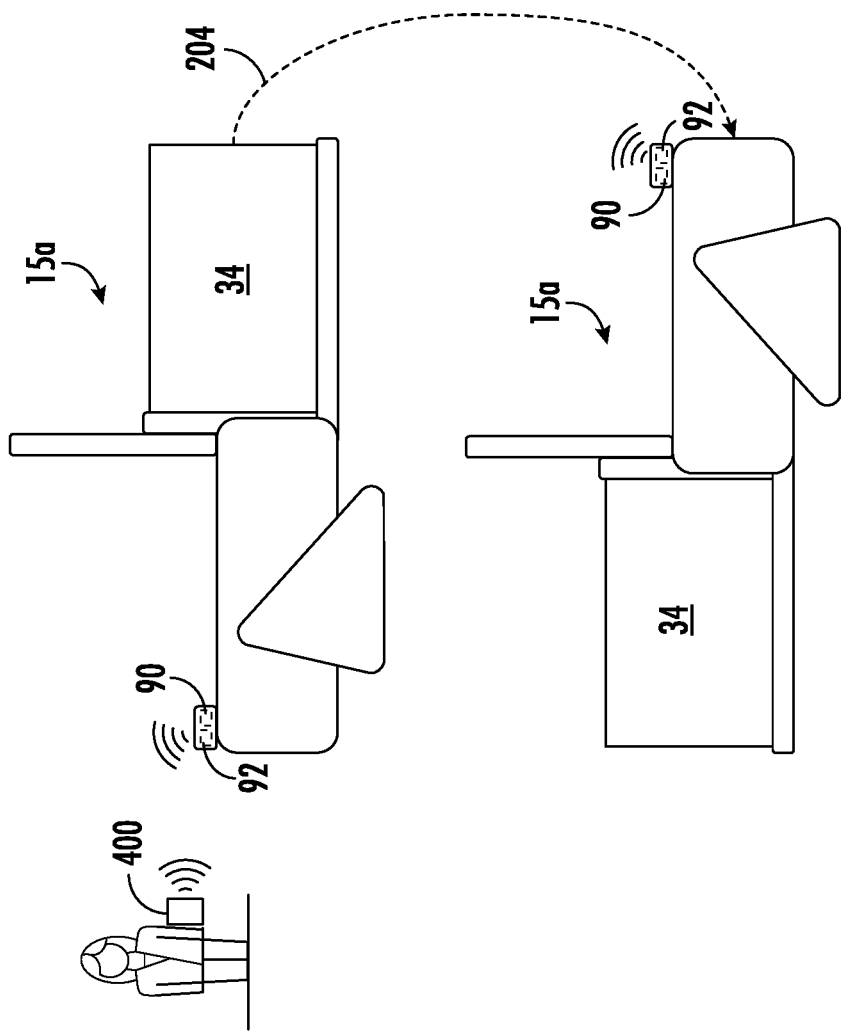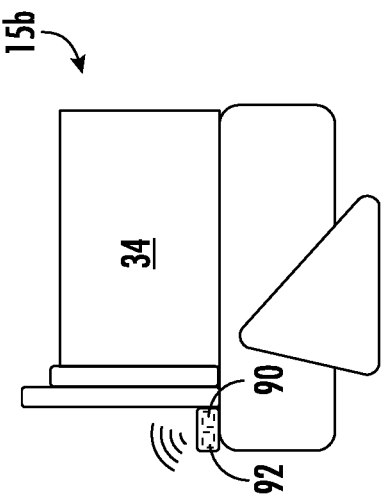
FIG. 7C

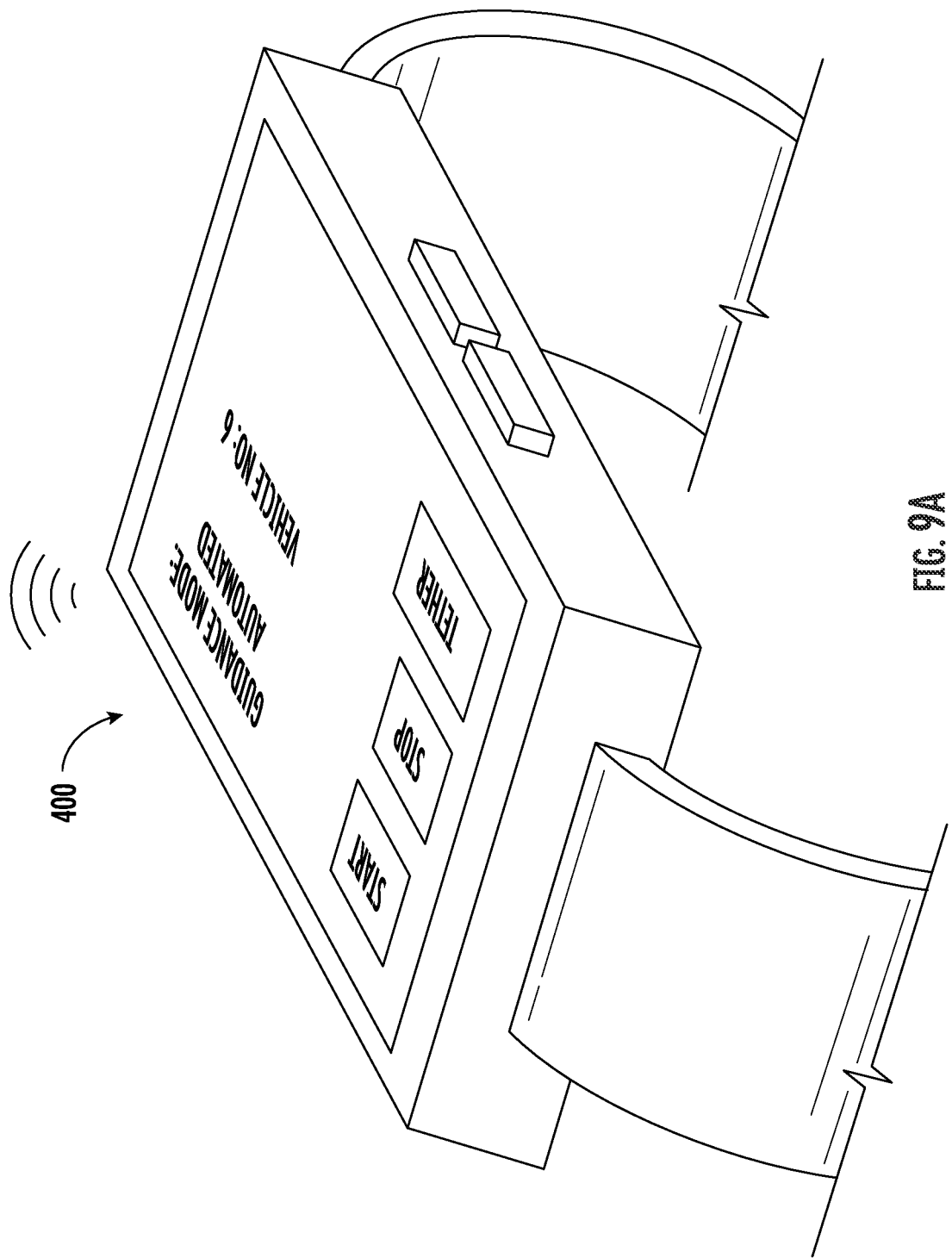

AUTONOMOUS LOAD MOVING ELECTRIC VEHICLE

TECHNICAL FIELD

The presently disclosed subject matter relates generally to an autonomously operating load moving electric vehicle and an autonomous navigation system for a load moving electric vehicle, such as a forklift with autonomous navigation.

BACKGROUND

Forklifts, also known as "fork trucks" or "lift trucks," are vehicles utilized to lift, transport, and place loads. For example, in a construction site, in a warehouse, or in other large commercial areas, supplies or goods are often being transported into, around and out of such sites or areas. In addition, supplies and goods often need to be transported multiple times, for example, between different way points in a site or area. Due to the transient nature of supplies or goods, they are often packaged on pallets for easy transportation and storage.

The pallets are designed to be moved and lifted easily by the forks of the forklift. Forklifts therefore are often used in commercial settings to lift palettes up and transport the palettes from location to location. Conventional forklifts generally include a manned cabin or cab, where a person operating the forklift manually controls its movements. To control the movements of a conventional forklift, they are generally equipped with a steering mechanism, such as a wheel to control the movements of the vehicle, and with knobs or other controls to manipulate the vertical height of the forks.

Conventional forklifts can be hazardous to operate, and they can cause many serious injuries when the forklift, for example, drops a load or tips over. Conventional forklifts can be at risk of tipping over when the center of gravity of the forklift is shifted out of the "triangle of stability," an industry term for the zone in which the center of gravity is safe for conventional three-point suspension systems used in forklifts. Functionally, if the load is lifted too high, or if the weight of the load is too far forward, the forklift can tip over, resulting in property damage and potentially even human injury. The triangle of stability is limited by the fact that the forks, and therefore the load, are in front of the wheels, requiring a counterbalance in back of the vehicle to remain upright. This counterbalance system is limiting in application.

The present disclosure provides an apparatus and method for operating an autonomous ground vehicle such as a forklift with a center of gravity and stabilization system that reduces the risk of a tip over. Also provided is a forklift that carries a load over the wheels and is able to translate a load horizontally.

SUMMARY

With parenthetical reference to corresponding elements, parts, portions, or surfaces of the disclosed embodiment, merely for the purposes of illustration and not by way of limitation, the present disclosure provides in an exemplary embodiment an autonomously navigating load moving electric vehicle (15). The vehicle including a chassis (16), a propulsor (46, 47) coupled with the chassis and operably connected with an electric power source (154), a platform (102, 104) arranged substantially at a center of gravity of the vehicle, wherein the platform defines a gap therein, a mast (28) connected with the chassis, and one or more forks (17) connected with the mast, wherein the forks are operable to translate vertically relative to the mast. The vehicle further includes a processing unit having a memory unit, a controller (22A) operable to receive and transmit signals to the processing unit, wherein the controller is operable to control the propulsor, and a plurality of perception sensors operable to transmit a signal to the processing unit, wherein the plurality of perception sensors are operable to detect environmental features. Wherein the processing unit is operable to navigate an environment in an automated guidance mode and navigate the environment utilizing signals from the plurality of perception sensors in a localization guidance mode. The processing unit operable to change from the automated guidance mode to the localization guidance mode.

In another exemplary embodiment, the present disclosure provides an autonomous vehicle (15) and navigation system, including a chassis (16), wherein said chassis is free of an operator cabin, a propulsor (46, 47) coupled with said chassis and operably connected with an electric power source (154), a platform (102, 104) arranged substantially at a center of gravity of said vehicle, wherein said platform defines a space therein, a mast (28) connected with said chassis, and one or more forks (17) connected with said mast, wherein said forks are operable to translate vertically relative to said mast. The vehicle further includes a processing unit (57) including a memory unit, and a controller (22A) operable to receive and transmit signals to said processing unit, wherein said controller is operable to control said propulsor and translation of said one or more forks.

In another exemplary embodiment, the present disclosure provides an autonomous vehicle (15) and navigation system, including a propulsor (46, 47) operably connected with an electric power source (154), a processing unit (57) including a memory unit, a controller (22A) operable to receive and transmit signals to the processing unit, wherein the controller is operable to control the propulsor. The autonomous vehicle and navigation system further including a plurality of perception sensors operable to transmit a signal to the processing unit, wherein the plurality of perception sensors are operable to detect environmental features. Wherein the processing unit is operable to navigate an environment in an automated guidance mode according to a planned route: operable to navigate the environment utilizing signals from the plurality of perception sensors in a localization guidance mode, and operable to navigate the environment in a localized remote guidance mode as a function of signals from a remote control (400). The processing unit is operable to change between the automated guidance mode, the localization guidance mode, and the localized remote guidance mode.

In another exemplary embodiment, the present disclosure provides an autonomous vehicle (15) and navigation system, including a chassis (16), a propulsor (46, 47) arranged to drive the chassis, wherein the propulsor is operably connected with an electric power source (154), a load bearing dynamic platform (17) operable to translate vertically, and a controller (22A) operable to receive and transmit signals, wherein the controller is operable to control the propulsor (46, 47). Wherein the controller is operable to navigate an environment utilizing one or more pre-planned routes in an automated guidance mode as a function of guidance from a global controller (200), and the controller is operable to navigate the environment utilizing signals from a remote control (400) in a localized remote guidance mode.

In another exemplary embodiment, the present disclosure provides an autonomous vehicle (15) and navigation system, including a chassis (16), wherein the chassis is free of an operator cabin, a propulsor (46, 47) arranged to drive the chassis, wherein the propulsor is operably connected with an electric power source (154), load bearing static platform (102, 104) operable to support a payload (34) arranged substantially at a center of gravity of the vehicle, wherein the load bearing static platform defines a space therein, a mast (28) connected with the chassis, wherein said mast is arranged within the space, and a load bearing dynamic platform (17) connected with the mast, wherein the load bearing dynamic platform is operable to translate vertically relative to the mast. The autonomous vehicle and navigation system further including a controller (22A) operable to receive and transmit signals, wherein the controller is operable to control the propulsor and translation of the load bearing dynamic platform, wherein the mast is configured to translate within the space, whereby the load bearing dynamic platform is configured to translate in two directions relative to the chassis.

In another exemplary embodiment, the present disclosure provides an autonomous vehicle (15) and navigation system, including a propulsor (46, 47) operably connected with an electric power source (154), and a controller (22A) operable to receive and transmit signals, wherein the controller (22A) is operable to control the propulsor. Wherein the controller is operable to navigate an environment utilizing one or more pre-planned routes in an automated guidance mode as a function of guidance from a global controller (200), the controller is operable to navigate the environment in a localized remote guidance mode as a function of signals from a remote control (400), and the controller is operable to change between the automated guidance mode and the localized remote guidance mode.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIG. 2 shows a top, rear, right side perspective view of the vehicle shown in FIG. 1.

FIG. 4 shows a top, rear, left side perspective view of the vehicle shown in FIG. 1 with no load.

FIG. 7C shows a schematic of an operating environment of an autonomous vehicle according to an embodiment of the present disclosure.

FIG. 9A shows a schematic of an autonomous vehicle remote control according to an embodiment of the present disclosure.

DETAILED DESCRIPTION OF THE EMBODIMENTS

Figure 1:
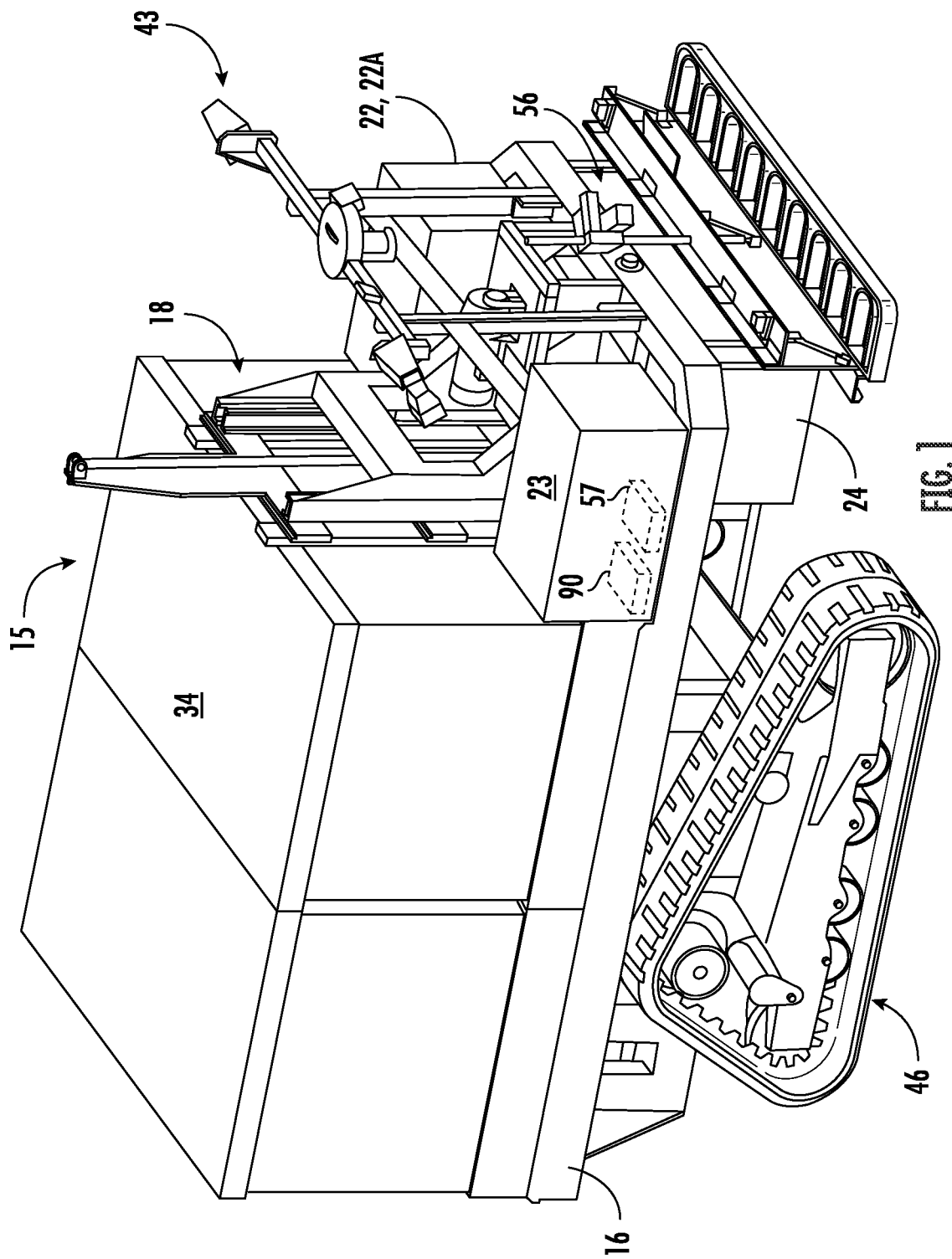
FIG. 1 shows a top, front, right side perspective view of a vehicle according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

It is to be appreciated that the present teaching is by way of example only, not by limitation. The concepts herein are not limited to use or application with a specific system or method. Thus, although the instrumentalities described herein are for the convenience of explanation, shown and described with respect to exemplary embodiments, it will be appreciated that the principles herein may be applied equally in other types of systems and methods involving autonomous vehicles.

Where used herein, the terms "first", "second", and so on, do not necessarily denote any ordinal, sequential, or priority relation, but are simply used to more clearly distinguish one element or set of elements from another, unless specified otherwise.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

Where used herein, the term "substantially" is intended to mean within the tolerance range of the equipment used to produce the value, or, in some examples, is intended to mean plus or minus 10%, or plus or minus 5%, or plus or minus 1%, unless otherwise expressly specified.

Where used herein, the term "exemplary" is intended to mean "an example of," "serving as an example," or "illustrative," and does not denote any preference or requirement with respect to a disclosed aspect or embodiment.

As illustrated in FIGS. 1-5, in an embodiment, an autonomous vehicle 15 is a forklift including a vehicle frame or chassis 16. The vehicle frame 16 generally supports forks 17, a vertical forklift track 18, a horizontal translation track 19, a vertical forklift actuator 20, a horizontal translation actuator 21, electronic enclosures 22, 23 (including one or more drive controllers, navigation controllers, and vehicle electronics), a battery 24, electric motors 25, 26, and a plurality of sensors.

In an embodiment, the forks 17 are generally operable to acquire and deposit a payload 34. The forks 17 are connected with and translatable vertically relative to a mast 28. The forks 17 and mast 28 are also translatable horizontally relative to the vehicle chassis 16. In an embodiment, the forks 17 include two forks, each describing a generally "L" shaped load bearing member having two generally transverse legs. The forks 17 each have a first leg 17A oriented horizontally and generally parallel to the ground or terrain surface and operable to support at least a portion of a load acquired by the forklift 17. The forks 17 also each have a second leg 17B oriented generally vertically and connected with the vertical actuator 20 via a carriage assembly 30. The forks 17 are movable in the vertical plane and also in the horizontal plane, relative to the vehicle frame 16.

In an embodiment, the vehicle 15 includes two rectangular panels 102, 104 positioned generally parallel to one another, with a space/gap between them, positioned over the chassis 16. In an exemplary embodiment, the panels 102, 104 are substantially positioned at the center of gravity or center of mass of the vehicle 15. The panels 102, 104 generally cover the length of the vehicle frame 16 and provide a dock or platform operable to support the load 34 acquired by the forks 17, and a mounting location for the electronics enclosures 22, 23. The forks 17, mast 28, and/or the carriage assembly 30 are arranged to fit in the gap between the two panels 102, 104. From within this gap, the carriage assembly 30, the mast 28, and the forks 17 are operable to translate horizontally and parallel with a longitudinal axis of the vehicle frame 16 along horizontal translation track 19.

The vertical forklift track 18 is generally supported by the mast 28 and connected with the carriage assembly 30 and translates horizontally with the carriage assembly 30. The carriage assembly 30 is itself movably connected to the vehicle frame 16 via, for example, the horizontal tracks 19 and one or more roller bearings and/or bushings. The carriage assembly 30 extends vertically from the frame 16 of the forklift 15, and the vertical forklift track 18 includes two rails located along the outer edges of the carriage assembly 30. The carriage assembly 30 is operable to move the forks 17 in the vertical plane relative to the carriage assembly 30 via the vertical forklift actuator 20. The vertical lift function of the carriage assembly 30 is further described intra.

The carriage assembly 30 is mounted on the horizontal translation track 19. The horizontal track 19 extends generally parallel with the longitudinal axis of the frame 16 along the outer edges of the gap defined by the plates 102, 104. The carriage assembly 30 is operable to move along the horizontal translation track 19 in the horizontal plane. In an embodiment, the horizontal translation track 19 guides the forks 17 from a base position, in which at least a substantial portion of the forks 17 are retracted onto the vehicle frame 16, to a horizontally translated position. When the forks 17 are in a fully translated position, the forks 17 are displaced from the vehicle frame 16 and are positioned at least partially beyond the rear 32 of the vehicle frame 16. The horizontal translation actuator 21 is operably arranged to move the carriage assembly 30 and the attached forks 17 along the horizontal translation track 19. The horizontal translation function of the forks 17 is further described intra.

The vehicle frame 16 includes a front scaffold 35. The front scaffold 35 is generally a support structure affixed to the vehicle frame 16 that provides support for lights, sensors, and/or cameras. The front scaffold 35 is located on the front of the vehicle frame 16. In an embodiment, the front scaffold 35 includes two diagonally oriented braces that further secure the front scaffold 35 to the vehicle frame 16. In an embodiment, the front scaffold 35 spans the gap between the two panels 102, 104.

In an embodiment, the front of the vehicle frame 16 includes a hanging shelf 36 and a camera pole 37. The camera pole 37 is affixed to the vehicle frame and is a vertical support between the vehicle frame 16 and the hanging shelf 36. Hanging shelf 36 is a shelf affixed to the front 33 of the vehicle frame 16. In an embodiment, the hanging shelf 36 is positioned at a level which is lower than the lip of the two panels 102, 104.

In an embodiment, the electronic enclosures 22, 23 are seated towards the front 33 of the frame 16. In an embodiment, the mass of the electronic enclosures 22, 23 contributes to a counterbalance of a load carried by the forks 17. When the forks 17 are translated from the footprint of the vehicle frame 16 to an extended position, any payload 34 on the forks 17 would shift the center of gravity rearward for the entire forklift 15. The counterbalance effect of the electronic enclosures 22, 23 (and battery 24) will ensure the forklift 15 does not tip over when a payload 34 is carried by the forks 17 in an extended position.

In an embodiment, the forklift 15 vehicle is propelled by two electric gear motors 44, 45 and one or more propulsors such as, without limitation, two continuous tracks 46, 47, two or more wheels, or a combination of tracks and wheels. For example, there is provided a right gear motor 44 which controls movement of right track 46, and a left gear motor 45 which controls movement of left track 47. The right gear motor 44 and right track 46 are affixed to the undercarriage of the vehicle frame 16 on the right side, underneath the right side panel of the vehicle frame 16. The left gear motor 45 and left track 47 are affixed to the undercarriage of the vehicle frame 16 on the left side, underneath the left side panel of the vehicle frame 16. In another embodiment, wheels can be used in place of the tracks 46, 47.

The forklift 15 includes a battery 24, which, in an embodiment, is attached to the underside of the vehicle frame 16. In an embodiment, the battery 24 will be seated towards the front 33 of the frame 16, to utilize its weight as a counterbalance to the payload 34. This counterbalance support is sufficient to maintain the balance and upright orientation of the forklift 15 when a payload carried by the forks 17 is fully translated to the furthest point on the horizontal translation track 19. In such a position, the footprint of the forks 17 is displaced from the footprint of the vehicle frame 16, and any payload on the forks 17 would shift the center of gravity rearward for the entire forklift 15 assembly. The counterbalance effect of the battery 24 (and electronics enclosures 22, 23) ensures the forklift 15 does not tip over when a payload is carried by the forks 17 in this extended position. It should be noted that the combined weight of the electronic enclosures 22, 23, the battery 24, and any other structural or accessory components on the front 33 of the forklift 15 will produce this counterbalancing effect. Therefore, in the several embodiments, one or more of these components will produce the desired counterbalance effect, and some components will not factor into the counterbalancing.

The battery 24 provides power to all the electronic components that are contained in the forklift 15 assembly. In an alternative embodiment, the battery powers some of the components, while others are supplied power by a component's own internal battery. In yet another embodiment, there are two or more batteries provided. The battery 24 may comprise a battery pack. The battery or batteries are in electric communication with the powered components, so as to provide power to them.

In an embodiment there is provided an auxiliary battery 120 in case of the main battery 24 failure. In a further embodiment, the auxiliary battery 120 is affixed to the hanging shelf 36 on the front 33 of the vehicle frame 16.

Figure 7A:
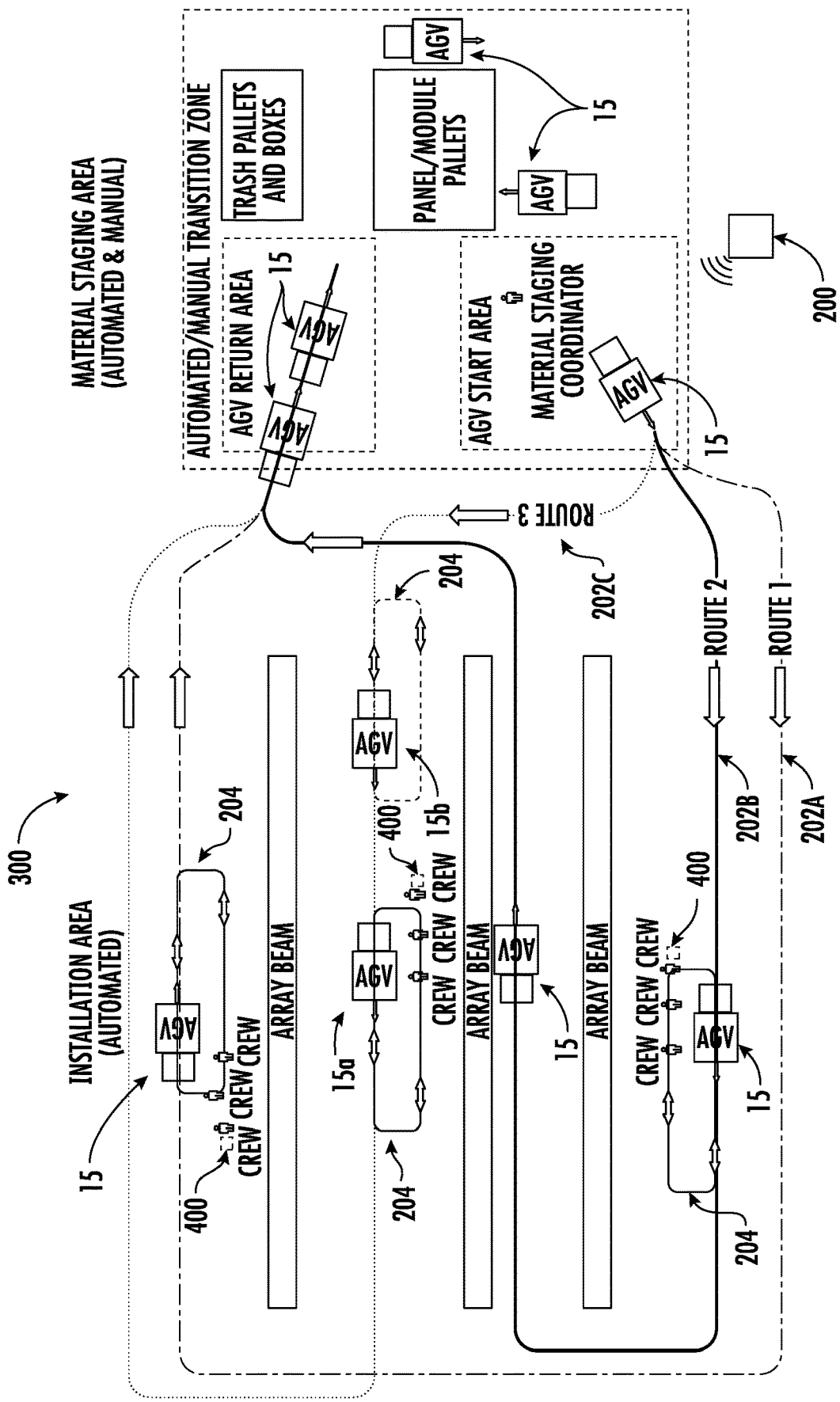
FIG. 7A shows a schematic of an operating environment of an autonomous vehicle according to an embodiment of the present disclosure.
Figure 7B:
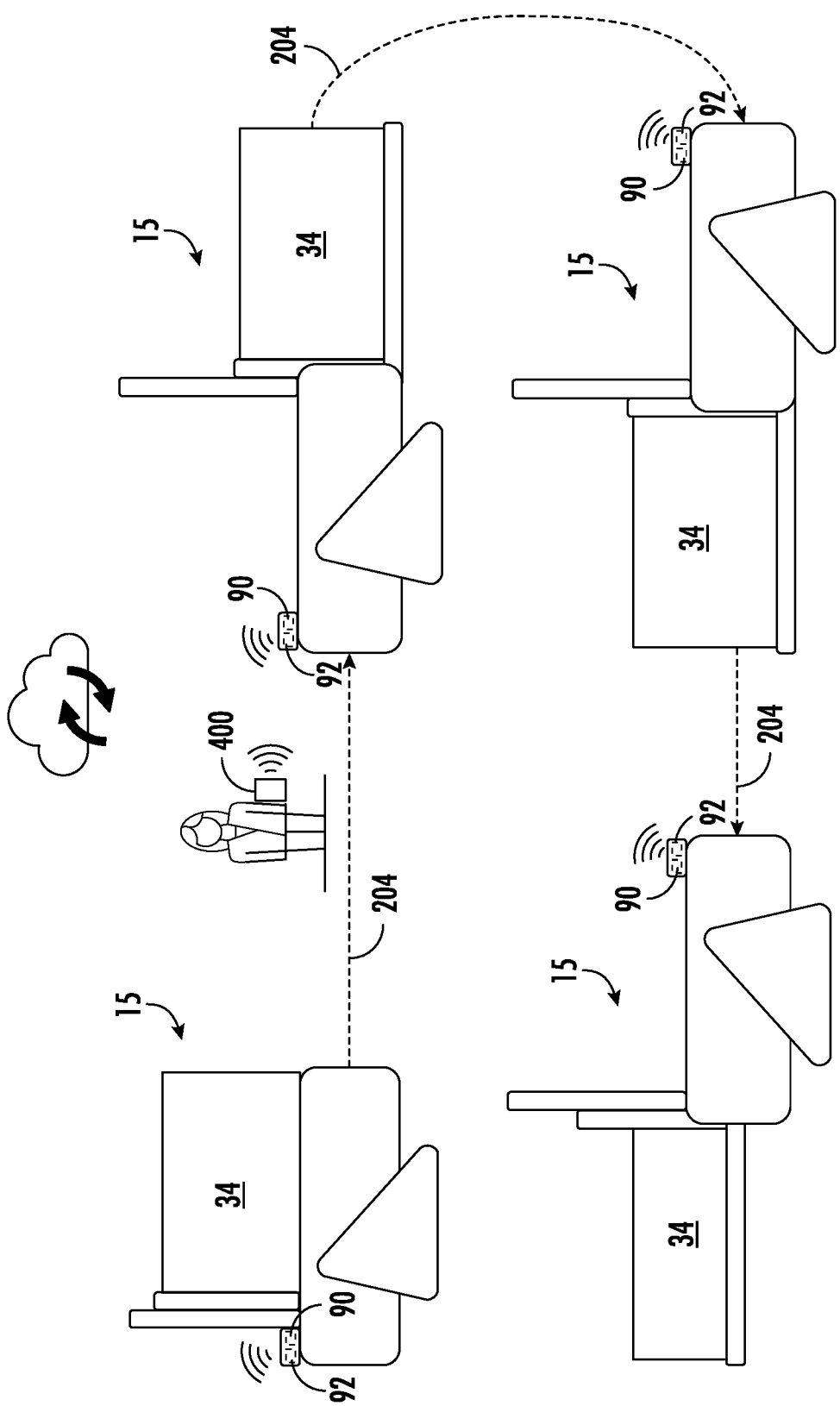
FIG. 7B shows a schematic of an operating environment of an autonomous vehicle according to an embodiment of the present disclosure.
Figure 7E:
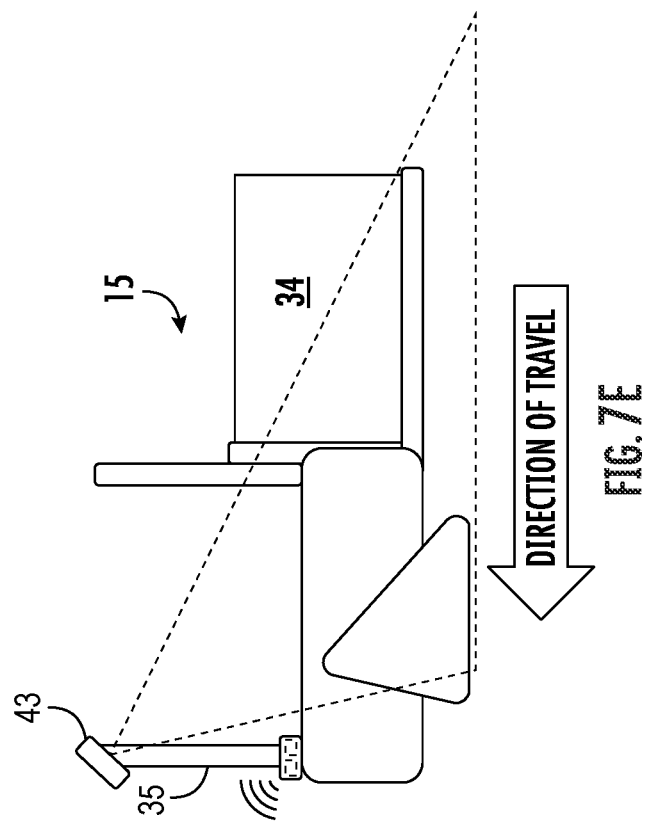
FIGS. 7D and 7E show schematic views of an autonomous vehicle according to an embodiment of the present disclosure.
Figure 7D:
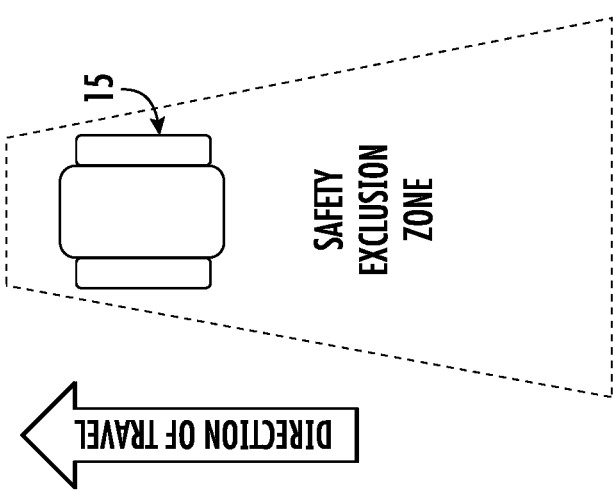

As illustrated in FIGS. 7D and 7E, in an embodiment, the front scaffold 35 holds curtain lights 43, where the light projection from the curtain lights 43 provides a visual indication of a safety exclusion zone to warn personnel who might come in contact with the forklift 15. The curtain lights 43 can be arranged in various orientations on the front scaffold 35. In an embodiment, the curtain lights 43 are arranged with one on the right side and one on the left side of the top of the front scaffold 35. From this configuration, the curtain lights 43 can illuminate a safety exclusion zone on either side of the forklift 15. In an embodiment, the curtain lights 43 are in electric communication with the battery 24. In an embodiment, the curtain lights 43 emit light outside the visible spectrum. In an embodiment, the curtain lights 43 do not emit light within the visible spectrum.

In an embodiment there is provided a horn 49 for auditory warning noises in certain trigger situations. In an embodiment, the horn is mounted onto the front scaffold 35. In an embodiment, the horn 49 is in electric communication with the battery 24.

In an embodiment there is one or more signal lights 50 that provide additional visual warnings to people in the surrounding environment under certain trigger situations. Such trigger situations can include the travel, translation, lift or other movement of the forklift 15 or the forks 17, fault, E-stop, parking brake engaged, close range obstacle detected, far range obstacle detected, automated route active, automated route inactive/paused and localized remote guidance mode enabled. In an exemplary embodiment, a signal light 50 includes signal modes including, without limitation, a steady red light, a blinking red light, a steady yellow light, a blinking green light, a steady green light, a blinking blue light, and a steady blue light. For example, each of the foregoing signal modes may signal, respectively, a fault, E-stop, parking brake engaged, close range obstacle detected, far range obstacle detected, automated route active, automated route inactive/paused and localized remote guidance mode enabled. In an embodiment, the signal light(s) 50 are in electric communication with the battery 24.

An embodiment also includes one or more mechanical emergency stops on the forklift 15. The emergency stop is a mechanical switch or mushroom button. When engaged, the emergency stop will break the electric communication powering the right and left gear motors 46, 47 or the vertical forklift actuator 20, or the horizontal translation actuator 21. It should be understood that there can be provided several individual emergency stops, and that any one emergency stop can break the electric connection between the battery 24 and all the listed motors and actuators. This emergency stop provides personnel an immediate override in case of urgent need to stop the forklift 15 or its movements.

Figure 3A:
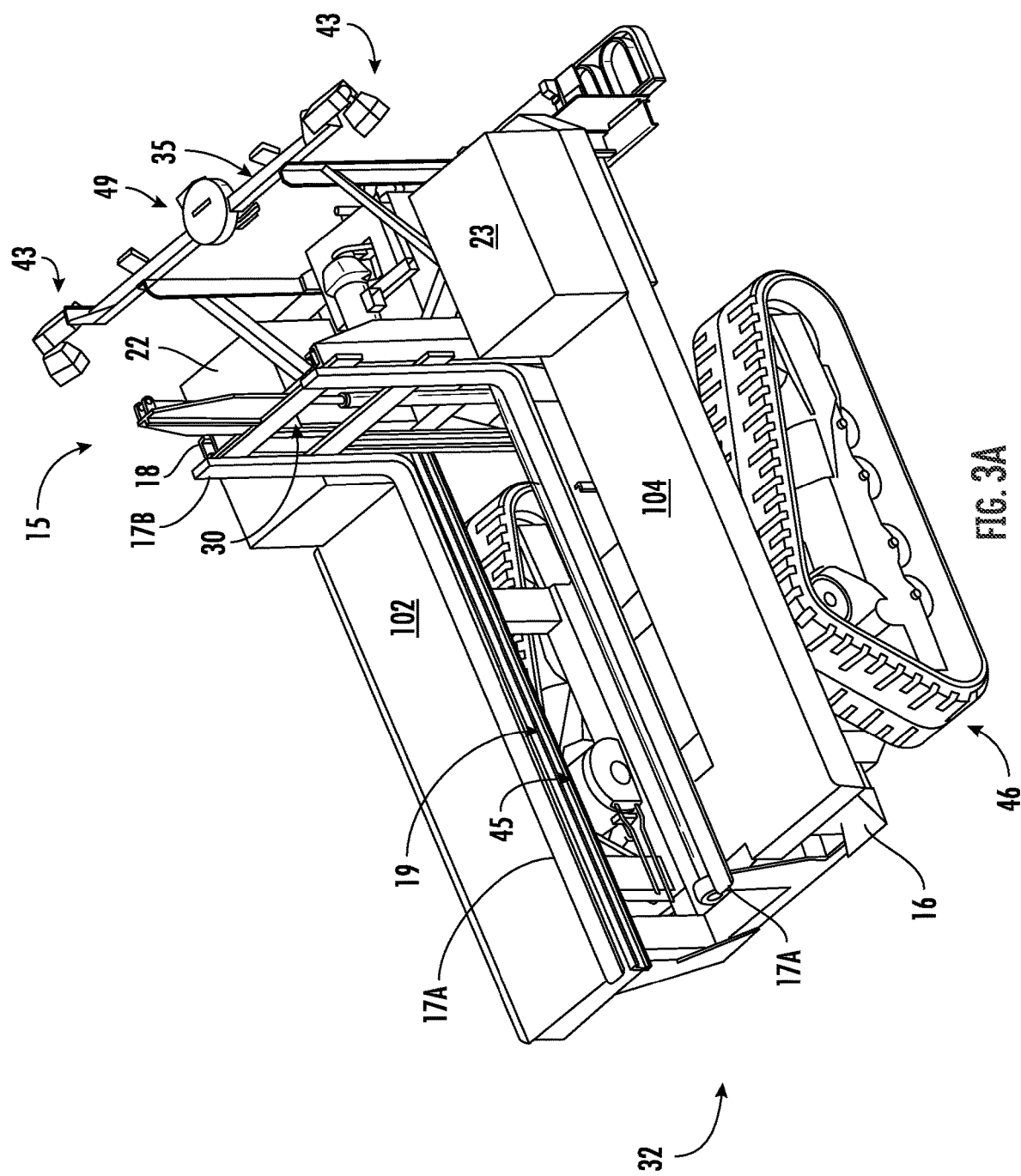
FIG. 3A shows a top, front, left side perspective view of the vehicle shown in FIG. 1 with no load.
Figure 3B:
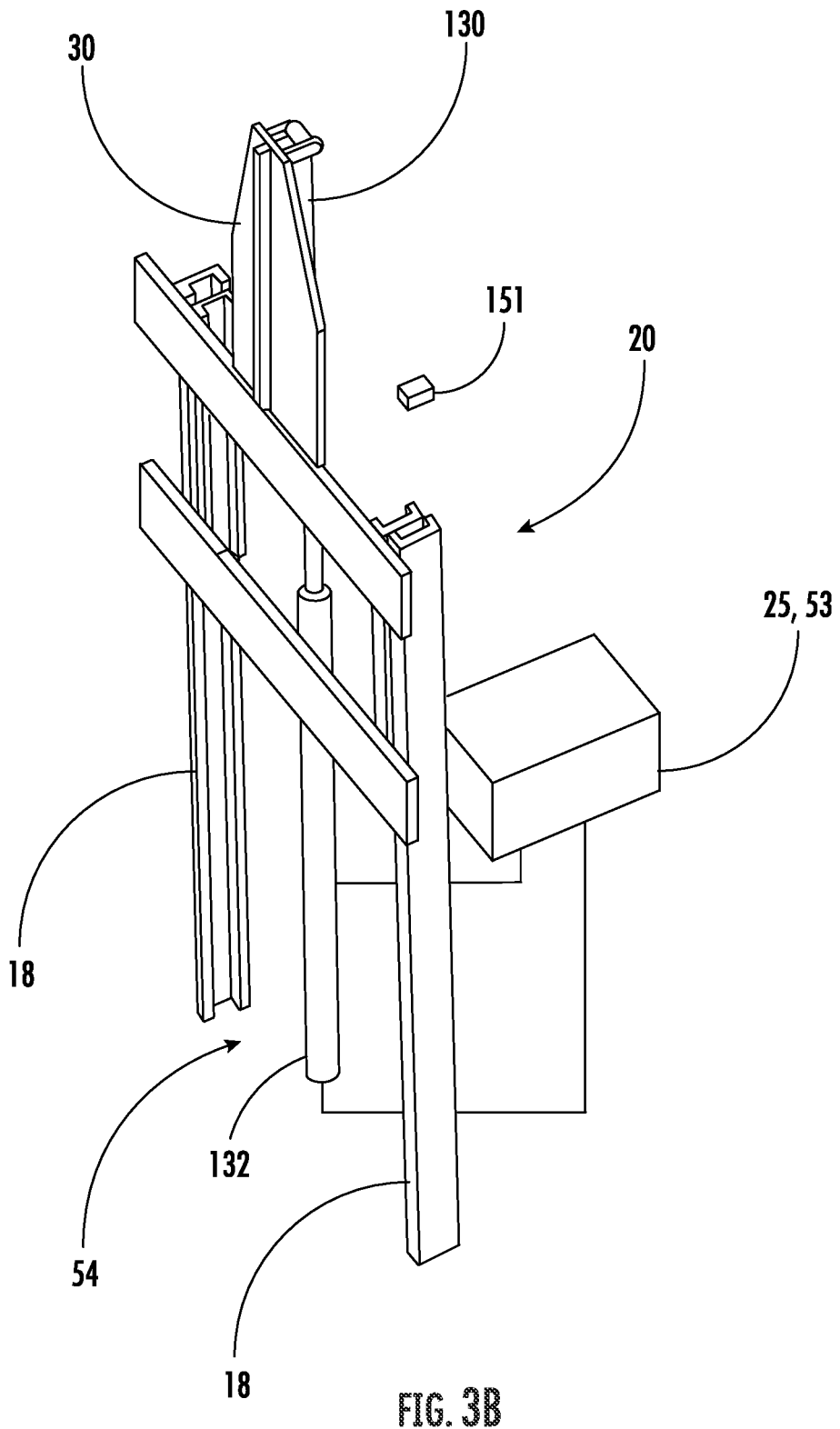
FIG. 3B shows a perspective view of a portion of a vertical actuation system shown in FIG. 3A.
Figure 6:
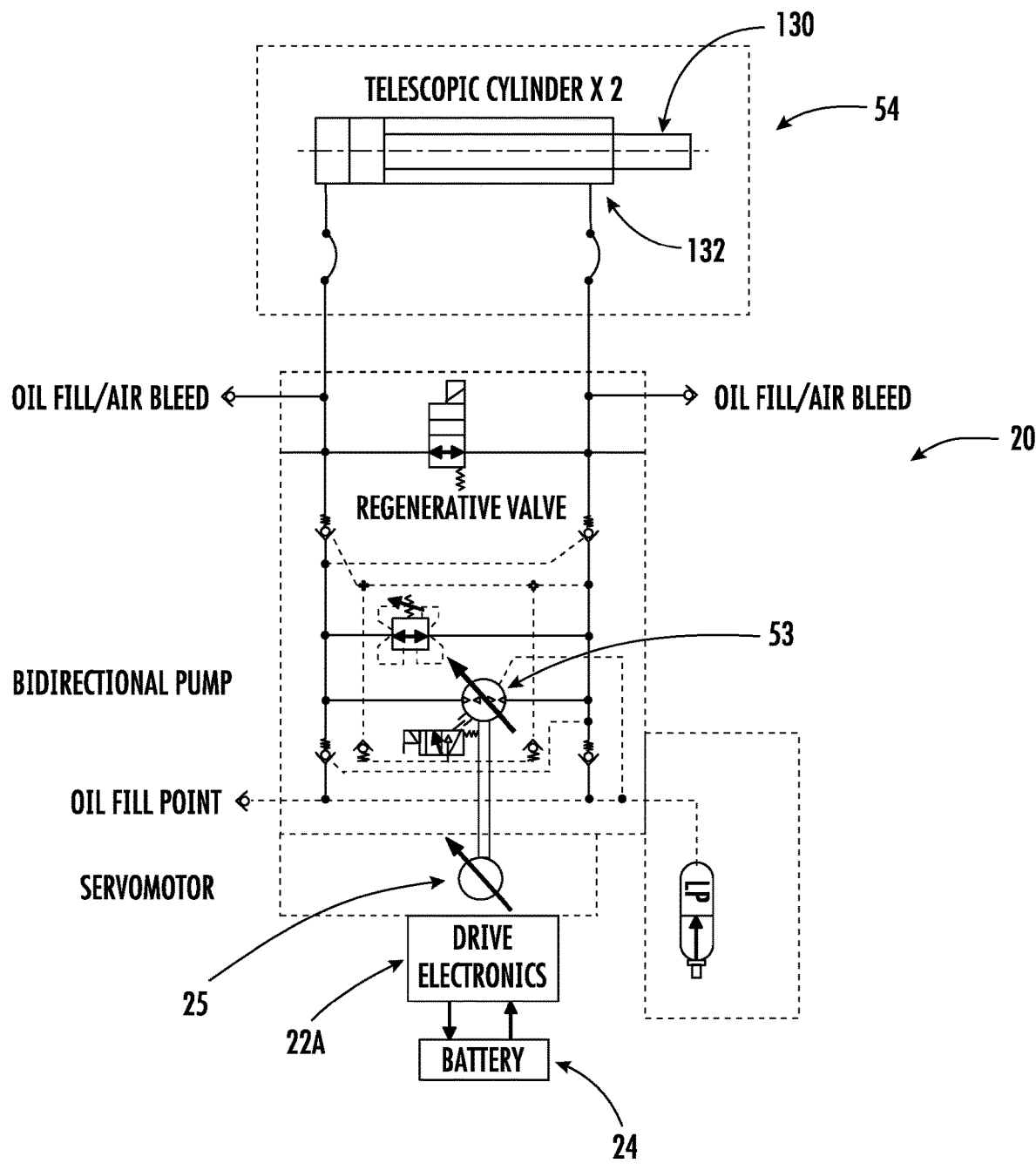
FIG. 6 shows a schematic of a double-acting hydraulic piston assembly according to an embodiment of the present disclosure.

The vehicle frame 16 includes the vertical forklift track 18 which enables the forks 17 to vertically reciprocate on the carriage assembly 30. Referring now to FIGS. 3A, 3B and 6, in an embodiment, the vertical forklift actuator 20 is an electrohydraulic actuator (EHA). The electrohydraulic actuator 20 includes a variable speed bidirectional electric servomotor 25, a bidirectional or reversible pump 53 driven by the motor 25, and a hydraulic piston assembly 54. The electric motor pump 53 is located on, and is movable with, the carriage assembly 30. The hydraulic piston assembly 54 is generally located on the forward side of the carriage assembly 30. In this embodiment, motor 25 is a brushless D.C. variable-speed servo-motor that is supplied with a current. In an embodiment, the electric servomotor 25 is in electrical connection with the power source 24 and receives power therefrom. The electric servomotor 25 may also receive electric power from an auxiliary power source to supplement the power supplied by battery 24. Electric servomotor 25 has an inner rotor with permanent magnets and a fixed non-rotating stator with coil windings. When current is appropriately applied through the coils of the stator, a magnetic field is induced. The magnetic field interaction between the stator and rotor generates torque which may rotate an output shaft. When the supplied current is of one polarity, the motor will rotate in one direction. When the supplied current supplied is of the opposite polarity, the motor will rotate in the opposite direction. Accordingly, motor 25 will selectively apply a torque on its output shaft in one direction about its motor axis at varying speeds and will apply a torque on its output shaft in the opposite direction about its motor axis at varying speeds. Other motors may be used as alternatives. For example, a variable speed stepper motor, brush motor or induction motor may be used.

In this embodiment, pump 53 is a fixed displacement bi-directional internal two-port gear pump. The pumping elements, namely gears, are capable of rotating in either direction, thereby allowing hydraulic fluid to flow in either direction. This allows for oil to be added into and out of the system as the system controller closes the control loop of position or pressure. The shaft of at least one gear of pump 53 is connected to output shaft of motor 25 with the other pump gear following. The direction of flow of pump 53 depends on the direction of rotation of motor and output shaft. In addition, the speed and output of pump 53 is variable with variations in the speed of motor 25. Other bi-directional pumps may be used as alternatives. For example, a variable displacement pump may be used.

In this embodiment, hydraulic piston assembly 54 includes a piston rod 130 slidably disposed within a cylindrical housing 132 such that the piston rod 130 may be driven in both directions relative to the housing 132. The piston rod 130 sealingly separates a left chamber from a right chamber. A first port of pump 53 communicates with the left piston assembly chamber via a first fluid line, and a second port of pump 53 communicates with the right chamber via second fluid line. The piston includes an actuating rod.

Bidirectional motor 25 turns bidirectional pump 53 and bidirectional pump 53 is hydraulically connected to piston assembly 54. Pump 53 and piston assembly 54 are a hydrostatic transmission, so as pump 53 spins in a first direction, the piston assembly rod 130 moves in a first direction and as pump 53 spins in the other direction, the piston assembly rod 130 moves in the other direction. Thus, piston assembly 54 will extend or move the rod 130 to the left when bidirectional motor 25 is rotated in a first direction, thereby rotating bidirectional pump 53 in a first direction and drawing fluid through the first port from the first line and the left chamber. Piston assembly 54 will retract the rod 130 or move to the right when bidirectional motor 25 is rotated in the other direction, rotating bidirectional pump 53 in the other direction and drawing fluid through the second port from the second line and the right chamber. The end of the rod 130 of the hydraulic piston assembly 54 is pivotally connected with the forks 17 via a vertically actuating portion of the carriage assembly 30.

Figure 3C:
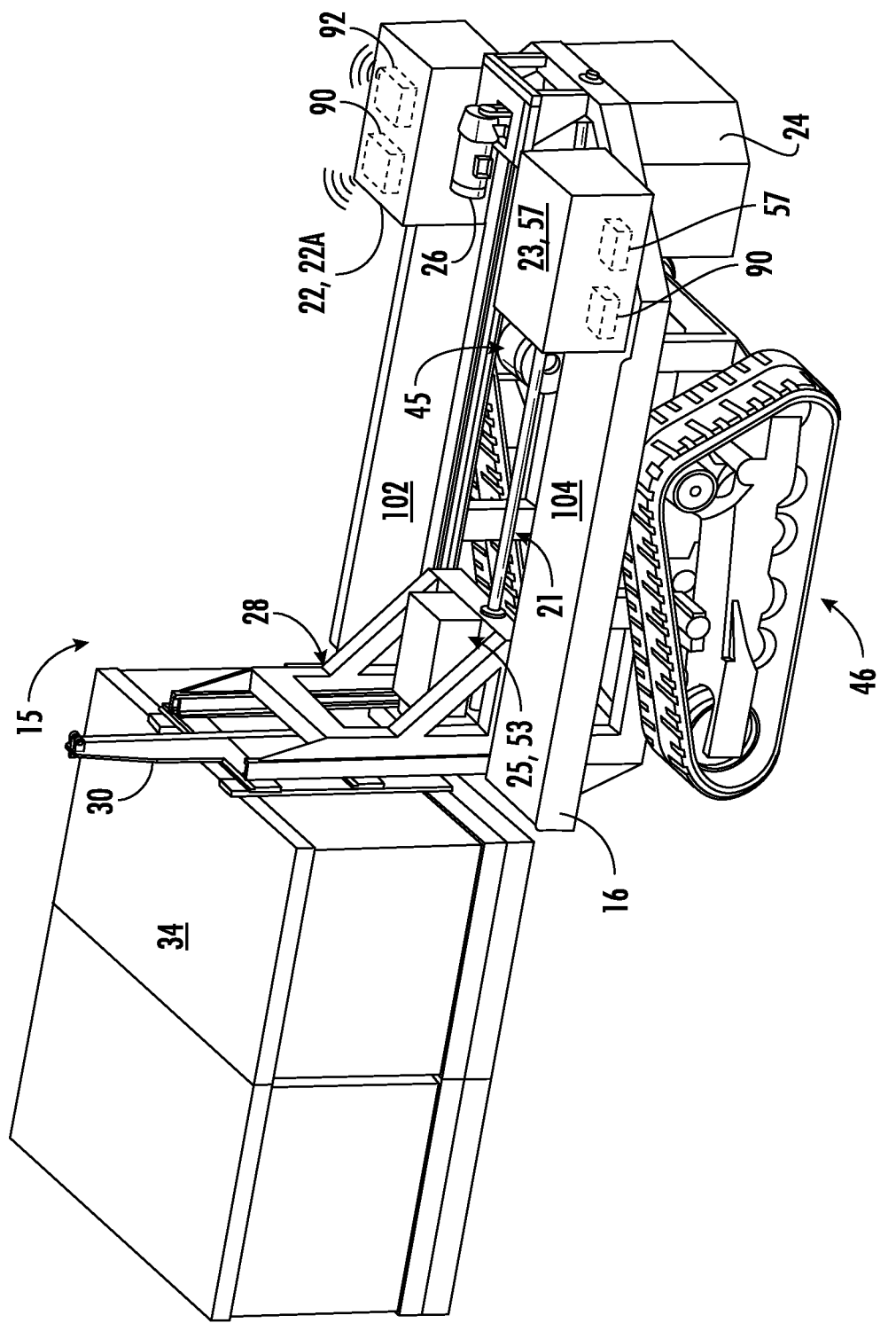
FIG. 3C shows a top, rear, left side perspective view of the vehicle shown in FIG. 1 with a load at a first terminal linear position.
Figure 3D:
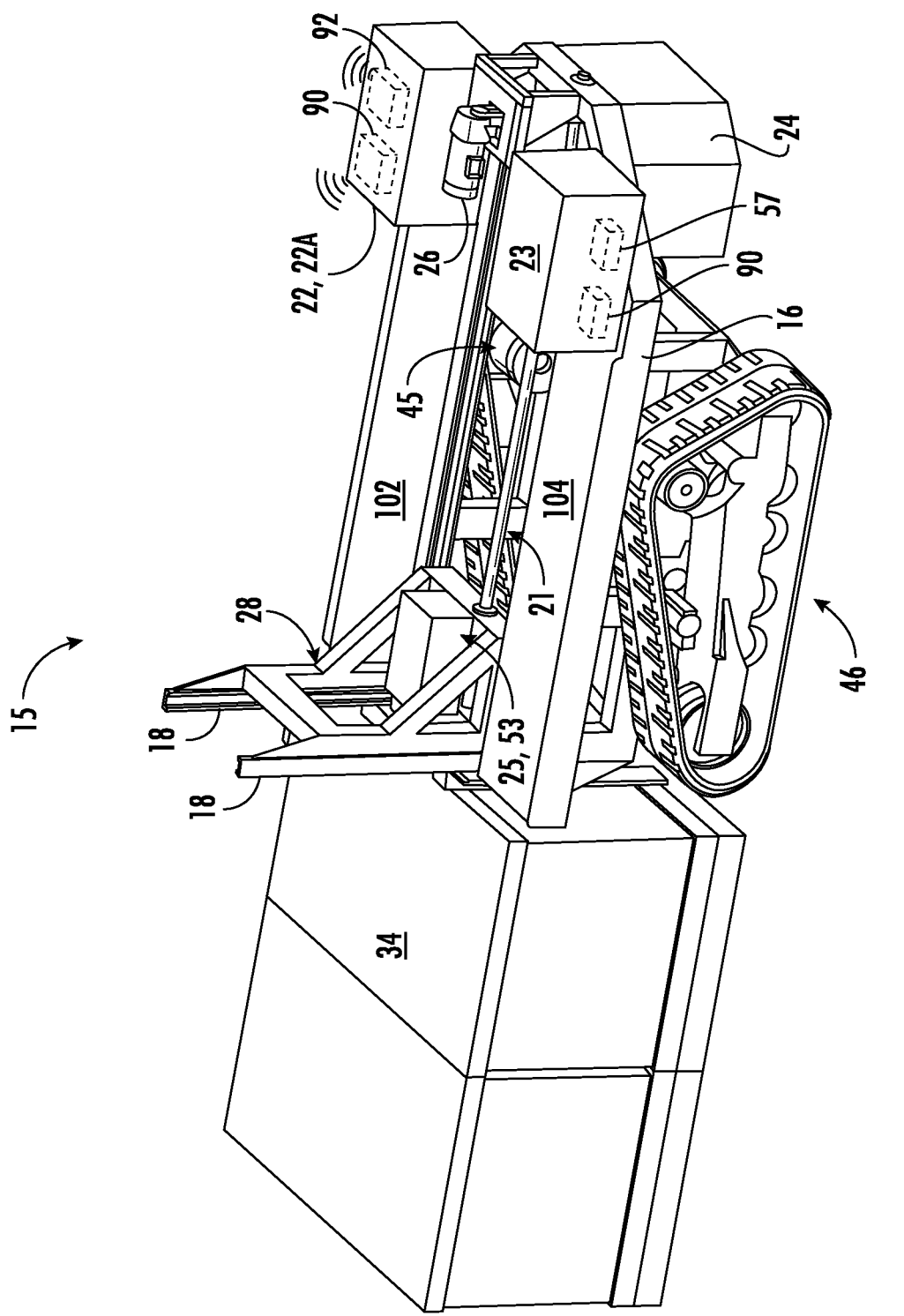
FIG. 3D shows a top, rear, left side perspective view of the vehicle shown in FIG. 1 with a load at a second terminal linear position.

Referring now to FIGS. 3C and 3D, the hydraulic piston assembly 54 is oriented such that engagement of the vertical actuator 20 provides vertical ascent and descent of the forks 17 along the vertical forklift track 18. The hydraulic piston assembly 54 has two terminal linear positions. As illustrated in FIG. 3C, in an embodiment, one of the terminal linear positions corresponds to a position where the forks 17 are at a level flush with the panels 102, 104 of vehicle frame 16 (raised). As illustrated in FIG. 3D, the other terminal linear position corresponds to a position where the forks 17 are at a level flush with the ground or the bottom of the tracks 46, 47 (lowered). The electrohydraulic actuator 20 is therefore operable to move the forks 17 along the linear vertical axis of the hydraulic piston assembly 54 between the two terminal positions of raised and lowered. The electric motor 25 is in electronic communication with an electric drive controller 22A in one or more of the electronic enclosures 22, 23. The controller 22A may include a processor/processing unit and a memory.

With continued reference to FIGS. 3A, 3B and 6, when the electrohydraulic actuator 20 needs to absorb gravitational forces during descent of the forks 17, the electric servomotor 25 is configured to operate as an electric generator that converts torque generated from such forces on the system into electricity that is stored in battery or capacitor bank 24. Thus, electrohydraulic actuator system 20 includes regenerative energy functionality. As shown, motor controller 22A supplies a current command to a regenerative power stage, which in turn supplies the current at an appropriate magnitude and polarity to the electric servomotor 25 to power the electrohydraulic actuator 20. The position of piston 130 is monitored via a linear feedback position sensor 151, and such position signals are then fed back to motor controller 22A. During the regenerative stroke of the hydraulic piston assembly 54 the effects of gravity will generate a force on piston 130, which in turn produces pressure on pump 53, which in turn produces a torque on the shaft of the electric servomotor 25. Under these conditions and in the regenerative mode, the electric servomotor 25 is configured to act as an electric generator. The motor controller 22A detects the current generated by the electric servomotor 25 in this capacity and transfers such current of the appropriate magnitude and polarity into battery 24. Such stored electrical energy may then be used to power the electric servomotor 25 and/or other electrical systems of the vehicle 15.

In an embodiment, the vertical movement of the forks 17 takes place when the platform is in a certain position in terms of the horizontal translation. The lowered position of the forks 17 places the forks 17 at a level below the components of the vehicle frame 16, so the forks 17 are first horizontally translated to a terminal position where the forks 17 are fully displaced from the vehicle frame 16 (translated), before it descends into the vertical terminal position of lowered.

The vehicle frame 16 also includes a horizontal translation track 19, which movably connects the carriage assembly 30 to the vehicle frame 16. The carriage assembly 30 is operable to move along the horizontal translation track 19 in the horizontal plane. In an embodiment, the horizontal translation track 19 guides the carriage assembly 30 and forks 17 from a base position (retracted) to a horizontally translated position (extended). When the forks 17 are in a fully extended position, they are completely displaced from the vehicle frame 16, and held out rearward of the vehicle frame 16. A horizontal translation actuator 21 is operably arranged to move the carriage assembly 30 and the attached forks 17 along the horizontal translation track 19.

Figure 5:
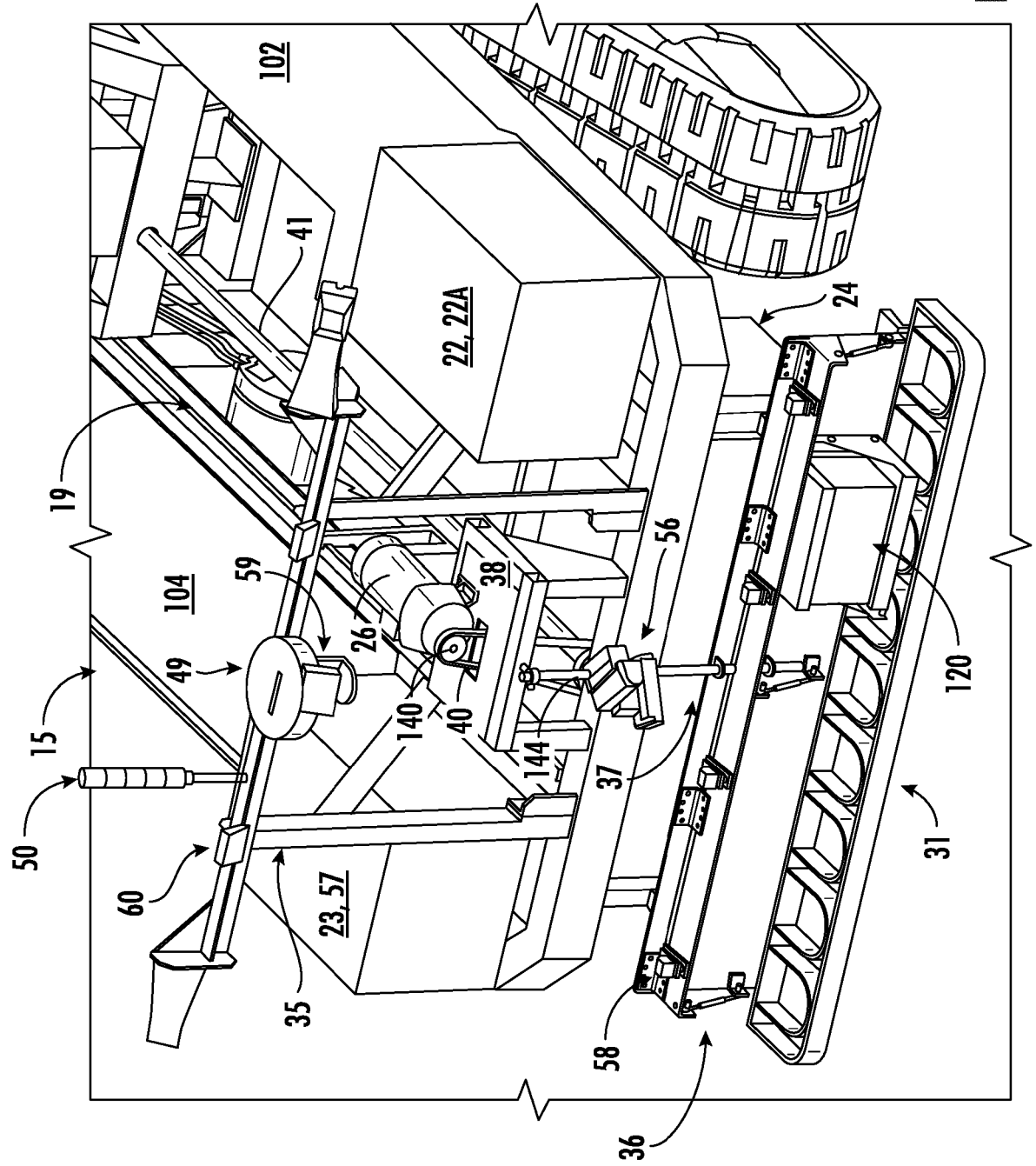
FIG. 5 shows a top, front, left side perspective view of a portion of the vehicle shown in FIG. 1 with no load.

In an embodiment, the horizontal translation actuator 21 is a lead screw assembly. Referring now to FIG. 5, the lead screw assembly 21 includes an electric motor 26 located on a motor platform 38. In an embodiment, the motor platform 38 is raised above the vehicle frame 16 and the panels 102, 104 to enable at least a portion of the carriage assembly 30 and/or the electrohydraulic actuator 20 to pass under the motor platform 38. A first sprocket 140 is connected with a rotor of the electric motor 26 via an output shaft. A roller chain 40 is located on or about the sprocket 140 and a second sprocket 144 connected with the lead screw 41. In an embodiment, the chain 40 is at least partially disposed though an opening in the motor platform 38 to accommodate the chain 40. The lead screw 41 is a long, generally cylindrical threaded screw with a first end connected to the chain 40 via the second sprocket 144, and a second end rotatably affixed to the vehicle frame 16 via a stanchion 146. The rear end of the lead screw 41 is carried by a bearing support 42.

Electric motor 26 causes rotational movement of the lead screw 41, which converts the rotational movement to linear movement. The lead screw 41 is attached to the underside of the carriage assembly 30, operably arranged such that the rotational movement of the lead screw 41 converts to the translational movement of the carriage assembly 30, carrying the forks 17, along horizontal translation track 19. In an embodiment, the electric motor 26 is in electric connection with the battery 24 and is in electronic communication with the electric drive controller 22A in enclosure 22, 23.

The horizontal translation actuator 21 is operable to translate the carriage assembly 30 between two terminal positions on the lead screw 41 and along the horizontal translation track 19. The first terminal position corresponds to the horizontal placement of the platform where the carriage assembly 30 is adjacent to the front scaffold 35 and the platform is nested between the two panels 102, 104 of vehicle frame 16 (base). The second terminal position refers to the horizontal position of the platform where the carriage assembly 30 is at the very rear 32 of forklift 15, and the forks 17 are fully displaced from the vehicle frame 16 (translated).

It should be noted that there are four total terminal positions of the forks 17. Two of the terminal positions refer to the two terminal positions along the vertical forklift track 18. These are "lowered" and "raised." The other two terminal positions refer to the two terminal positions along the horizontal translation track 19. These are "base" and "translated." When the forks 17 are at rest, it will most likely occupy two of these terminal positions, one describing its vertical placement and one describing its horizontal placement. For example, the forks 17 can be "translated" and "raised," or "translated" and "lowered." As previously described, the "lowered" position occurs when the platform is "translated," so the "base" position is associated with the "raised" position.

In an exemplary embodiment, the controller 22A provides automated control and operation of the forks 17 (e.g., horizontal and vertical translation and tilt/tip). For example, automated control and operation of the forks 17 facilitates improved load 34 handling ergonomics because human operator intervention, and any accompanying error, is not required.

When a payload 34 is on the forks 17, and the platform is in the "base" and "raised" position, the weight of the payload is centered and/or aligned over the tracks 46, 47 at a center of gravity of the vehicle 15. This has the effect of stabilizing the balance of the forklift 15. The "base" position is used when the forklift 15 is driving across terrain, which ensures that the forklift 15 has a center of gravity that remains consistently within safe limits. Carrying the weight of the payload 34 over the tracks 46, 47 at the center of gravity of the vehicle 15 avoids the vehicle 15 tipping over, and also allows heavier loads to be carried relative to a conventional forklift.

Having the horizontally translating forks 17 operable to arrange a load 34 on the platform 102, 104 at a center of gravity of the vehicle 15 provides improved load stabilization during transportation and stopped conditions. In an embodiment where the propulsors comprise the two continuous tracks 46, 47, centering the load 34 over the tracks 46, 47 further improves load stabilization. The autonomous forklift 15 also enjoys the advantage of reduced overall mass because the horizontally translating forks 17 operable to arrange a load 34 on the platform 102, 104 at a center of gravity of the vehicle 15 requires less counterweight than conventional designs to offset the load 34. Further, the horizontally translating forks 17 operable to arrange a load 34 on the platform 102, 104 at a center of gravity of the vehicle 15 reduces the necessary length of the vehicle 15, thereby improving the maneuverability of the vehicle 15 via providing, inter alia, a smaller turning radius of the vehicle 15. The autonomous vehicle 15 is also operable at increased speeds over unsurfaced terrain (e.g., gravel, rocks, rutted, etc.) relative to conventional vehicles because the absence of an operator cabin, inter alia, provides increased vehicle stabilization and obviates the need to account for operator vibration, shock, and impact.

Referring now to FIGS. 1 and 5, the autonomous vehicle 15 includes a sensor system operable to provide data to an autonomous navigation controller 22A. In an embodiment, the sensor system includes two depth sensing cameras 56. Each depth sensing camera 56 includes a right imager and a left imager, in order to build a composite image that can be used to calculate distance. The depth camera 56 also has, in an embodiment, an infrared projector to give infrared (IR) illumination of the surroundings to ensure accuracy and image detection in low light or no light situations. In an exemplary embodiment, the depth sensing cameras 56 are mounted on the camera pole 37, facing outwards towards the front 33 of the forklift 15. This position on the camera pole 37 ensures that the cameras 56 capture an optimal view of the surroundings. In an embodiment, the depth sensing cameras 56 are tilted up to 30 degrees downward from the mount. This configuration avoids wasting any of the camera field of view on ceiling or sky imaging: this configuration may be particularly useful in outdoor environments such as, without limitation, agricultural land/fields and photovoltaic power stations/solar parks. Additionally, the two cameras 56 are angled apart, one slightly right and one slightly left, to maximize the sensed field of view between the two cameras 56. The depth sensing cameras 56 are in electronic communication with the controller 22A in the electronic enclosure 22, 23. The depth sensing data is sent to the controller 22A.

In an exemplary embodiment, one or more sensors of the sensor system are connected with and/or secured to a front scaffold 35. In an embodiment, the front scaffold 35 enables one or more optical sensors to be located at elevation to, inter alia, minimize the effects of dust contamination and increase field of view (FOV). In an exemplary embodiment, one or more sensors of the sensor system are arranged at elevation about the perimeter of the vehicle 15. For example, one or more of the sensors arranged about the vehicle perimeter may be opto-electronic devices comprising a transmitter and receiver configured to produce a safety curtain (e.g., light curtain, virtual barrier, etc.). In another example, one or more of the sensors arranged about the vehicle perimeter may be cameras (e.g., charge-coupled device sensors (CCD), complementary metal oxide-semiconductor sensors (CMOS)) configured to produce a safety curtain (e.g., virtual barrier).

A plurality of ultrasonic radar sensors 58 are provided. These sensors use sonic waves and sensors to detect close range obstacles. The ultrasonic sensors 58 are mounted on the hanging shelf 36 in the front 33 of the forklift 15. The ultrasonic sensors 58 are arranged at the same height along the hanging shelf. The ultrasonic sensors 58 must be mounted without any blockage from any components of the forklift 15 or its structure. Each ultrasonic sensor 58 has a programmable range, and the optimal range will vary based on the speed of operation of the forklift 15. The plurality of ultrasonic sensors 58 can be synchronized to further prevent interference. The ultrasonic sensors 58 are in electric connection with battery 24 and are in electronic communication with the controller 22A in the electronic enclosure 22, 23. The ultrasonic detection data is sent to the controller 22A.

An LED Lidar sensor 59 is provided. Lidar sensors emit a light (e.g. a laser or an LED) and measure the time for the reflected light to return to the sensor. This time measurement is converted to a distance measurement corresponding to the distance of the object or obstacle that reflected the light. The LED Lidar sensor 59 is mounted to the top of the front scaffold 35, to provide a useful "bird's eye" view of surrounding obstacles. Each separate LED beam of light is a separate data point, measured by reflection return time. This results in a data point "cloud" that generally paints a general picture of obstacles in the surroundings. This data is sent to controller 22A. The LED Lidar sensor 59 is in electric connection with battery 24 and is in electronic communication with the controller 22A in the electronic enclosure 22, 23.

There is also provided a radio frequency (RF) beacon 60 for emitting radio signals that help with locating and identifying forklifts 15. The RF beacon 60 can be mounted on the front scaffold 35. The RF beacon 60 is in electric connection with battery 24.

There is also provided a sensing bumper 31. The sensing bumper 31 detects when it has come in contact with an obstacle. The bumper 31 transmits this data to the controller 22A. The sensing bumper 31 is in electric connection with battery 24 and is in electronic power communication with the controller 22A in the electronic enclosure 22, 23. In an embodiment, the sensing bumper 31 comprises a pressure sensor or switch operable to stop movement of the forklift 15 and/or shutdown forklift 15 operations.

A forklift may utilize the sensor data to automatically navigate, steer, propel, and/or stop the forklift. For example, the navigation controller processing unit calculates the distances from the forklift 15 to a target shelf, and the distances from shelf to shelf, or from shelf to wall or other obstacle, or between obstacles. The navigation controller processing unit utilizes the relative shelf locations to calculate the angular adjustment needed and turns a steering caster the desired angle in order to point the forklift 15 in the correct direction. The navigation controller processing unit then causes the forklift 15 to move to the recalculated position and the cycle then repeats itself. Several types of sensors may be utilized with the forklift, including but not limited to, lasers and an ultrasonic sensor.

A forklift may utilize an autonomous operating system ("AOS") operable to enable the autonomous forklift to complete a task without on-board human operators. In an embodiment, the AOS determines an optimal path through the selected terrain, for example a construction site, and navigates through the environment along a programmed path with user input only to deal with unexpected events on an as-needed basis. For example, the AOS enables one or more autonomous forklifts to traverse an environment according to a pre-planned route/path. The AOS may include a safety system that includes monitoring for obstacles, stopping the forklift when obstacles are detected, and keeping the autonomous forklift within the programmed path and allowed boundaries during operation thereof. Any adjustments to the autonomous forklift made during operation thereof may also be automated. The adjustments may include, for example, speed and load/fork height settings. In an exemplary embodiment, the load 34/fork 17 height is a function of the vertical actuator electric servomotor 25 current, a load cell signal, or an optical sensor signal. For example, the load cell may be a hydraulic load cell arranged in the hydraulic piston assembly 54. In an embodiment, the optical sensor is arranged on the mast 28. Because the fork(s) 17 height can be automatically adjusted without human intervention, the autonomous forklift 15 provides improved load handling ergonomics. A single person may monitor a plurality of autonomous forklifts from an on-site location or more remotely.

The autonomous forklift includes a plurality of sensors operable to transmit their sensor data to a processing unit. In an embodiment, the sensor is a depth camera, the sensor is a global positioning system ("GPS") receiver, the sensor is an inertial measurement unit ("IMU"), the sensor is a light detection and ranging unit ("LIDAR"), the sensor is a radar, the sensor is an ultrasonic unit, and/or the sensor is an odometry unit. Embodiments of the processing unit include at least one processor and at least one memory unit. The processing unit is in electrical communication with a controller. The controller is operable to receive command signals from the processing unit and control the steering, throttle, and brakes of the autonomous forklift utilizing the sensor data. In an embodiment, the controller is also operable to receive signals from the sensor array to provide signals to the autonomous forklift.

In operation, when the autonomous forklift enters an operating environment, the on-board sensors provide localization and situational awareness data to the processing unit. The sensor data and status information enable the processing unit to determine the optimal guidance mode and locates the autonomous vehicle with respect to any detected feature and/or GPS waypoints in the vicinity. The localization process performed utilizing the processing unit creates heading and path planning commands utilized by the controller for steering, throttling, and braking the autonomous forklift to move unimpeded in its environment while simultaneously mapping its surroundings.

In an embodiment, the processing unit is operable in at least four forklift guidance modes: (i) automated guidance, (ii) localization guidance, (iii) yaw rate guidance, and (iv) localized remote guidance. The processing unit of the autonomous forklift system operates to change between the guidance modes when GPS data and or communication with a centralized controller 200 (see FIG. 7A) is limited or denied and/or when the perception sensors utilized in the localization guidance mode experience a fault. Automated guidance mode enables the autonomous forklift to navigate in an environment via a planned/pre-planned route or path. For example, in the automated guidance mode the controller 22A may navigate a forklift via specified GPS waypoints. In an exemplary embodiment, the automated guide mode utilizes real-time kinematic positioning (RTK) or carrier-phase enhancement GPS. The automated guidance mode may also be referred to herein as global automated control. Localization guidance mode enables the autonomous forklift to navigate an environment based on detectable objects or features, identified via the perception sensors in the area. Yaw rate guidance mode allows the autonomous forklift to maintain its current heading while mitigating any angular rates about the vertical steering axis. The yaw rate guidance mode may be used as a safety mode, but is not so limited, should the GPS and/or communication with a centralized controller 200 and the perception sensors experience a fault simultaneously. Localized remote guidance mode enables the autonomous forklift to follow a planned/pre-planned path route or path, such as described with regard to the automated guidance mode, and cooperatively provide at least limited control of the vehicle to an operator positioned generally local to the autonomous vehicle. In an exemplary embodiment, such limited controls include start, stop, and follow commands and functionality.

The memory unit of the controller 22A is able to save position/location information of detected environmental features and provide a map of the environment surrounding the autonomous forklift 15 during operation. Coordinates and position information of environmental features relative to the location of the autonomous forklift AOS are saved in the memory unit and are updated as the autonomous forklift 15 moves about the environment. This ability to save and map detected features provides relative navigation information that can be used to determine the location of one environmental feature with respect to other environmental features. In an embodiment, the automated guidance mode for the autonomous forklift 15 is developed using model-based design. This model-based design allows the pre-planned route to be rapidly modified and updated in a simulation environment before being autocoded directly to the on-board autonomous forklift AOS.

In an embodiment, the AOS is utilized with the autonomous forklift 15 operating in a visually occluded environment that may be denied GPS data and or communication with a centralized controller 200 (see FIG. 7A). The autonomous vehicle 15 includes the on-board AOS having the plurality of sensors. The sensor array is in electrical connection with the processing unit. The processing unit is in further electrical connection with the on-board controller for, inter alia, steering, throttling, and braking the autonomous forklift. In addition, the processing unit is in electrical communication with the on-board controller via a wireless connection. The controller may also be in electrical connection with a steer-by-wire system.

In the automated guidance and localization guidance modes, the AOS is operable to navigate throughout an environment via sensor fusion techniques that enhance situational awareness using a combination of sensors. The AOS may be outfitted with a tactical-grade IMU and a single GPS antenna to allow for a GPS/INS (inertial navigation system)

solution. In addition, the AOS is operable to receive signals from laser, vision, and sound-based localization sensors 56, 58, 59, 60 (e.g., LIDAR, RADAR, ultrasonic, and depth cameras) to allow for obstacle detection and continued operation in a GPS-denied environment.

As the AOS enters an operating environment, the on-board sensor suite provides localization and situational awareness data to the processing unit. The controller 22A handles high-level decision making for the vehicle, including handling guidance mode selections, transitions, and faults.

In an embodiment, as the sensor data and status information is acquired, the processing unit determines the optimal guidance mode and locates the AOS with respect to any detected features and/or GPS waypoints in the vicinity. This localization process creates heading and path planning commands for steering, throttling, and braking, thereby allowing the autonomous forklift to move unimpeded in the environment while simultaneously mapping the surroundings.

Automated guidance mode allows the AOS to navigate an environment via, for example, specified GPS waypoints. The AOS latitude/longitude and target GPS waypoint latitude/longitude may specify a heading command for the AOS to follow. Knowledge of previous GPS waypoint latitude/longitude allows for rhumb line guidance, generally forcing the AOS to maintain a straight line between the previous and target GPS waypoints.

Localization guidance mode allows the AOS to navigate an environment based on detectable objects and/or features in an area. These features may be determined via the on-board, non-GPS based sensors such as the LIDAR, RADAR, depth camera, and/or ultrasonic. Upon identifying the local features, the localization guidance mode generates a heading command to safely navigate around or between objects.

Yaw rate guidance mode allows the AOS to maintain the current heading while mitigating any angular rates about a vertical steering axis. This mode may be utilized as a safety mode should the GPS and localization sensors experience a fault simultaneously.

Using the on-board localization sensors, the processing unit has the ability to save detected features and provide a map of the surrounding environment during operation. Coordinates of features relative to the location of the AOS may be saved in memory and updated as the AOS moves about the environment. Environment mapping provides relative navigation information that may be used to determine the location of one feature with respect to another. The on-board vision system and depth camera may be used to enhance the environment mapping through object detection and classification. Further, with available GPS data, the position of each local feature may be determined.

Figure 9B:
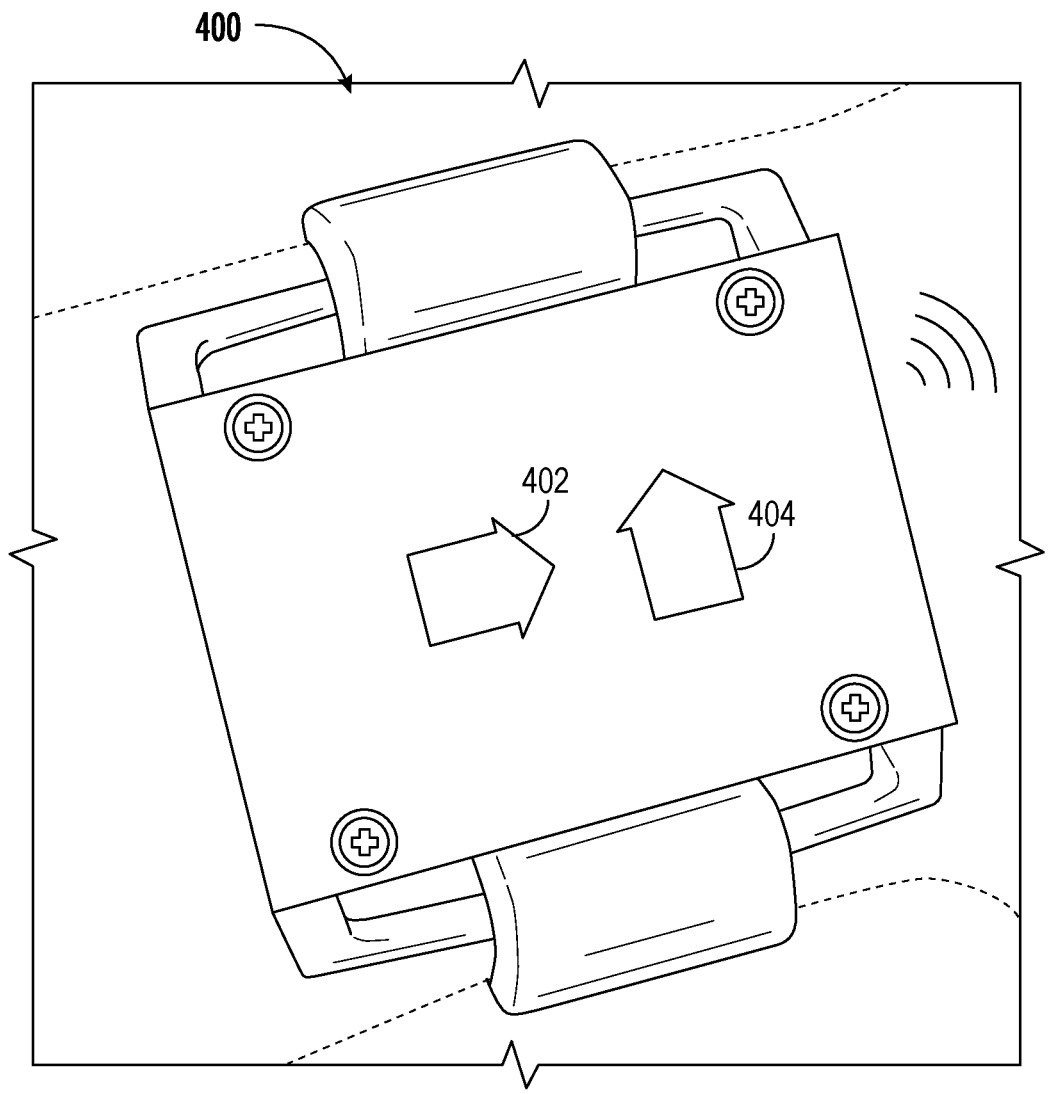
FIG. 9B shows a schematic of an autonomous vehicle remote control according to an embodiment of the present disclosure.

In an embodiment of the localized remote guidance mode, an autonomous vehicle system includes an autonomous forklift, the AOS, and a remote control 400. In an embodiment, the remote control 400 includes a user handstation operable to receive and transmit user inputs via a transceiver, and a user interface operable to display sensor and/or status information from the autonomous forklift. The remote control 400 is operable to communicate with the autonomous vehicle 15 through a wireless connection with a local transceiver 90 of the controller. In an embodiment, the local transceiver 90) and the global transceiver 92 comprise a single transceiver. The remote control 400 may be, but is not limited to, a tablet and/or laptop. As illustrated in FIGS. 9A and 9B, in an embodiment, the remote control 400 is a wristband and/or smartwatch operable to be worn by a member of a work crew (i.e., an operator). As illustrated in FIG. 9B, in some embodiments, the remote control 400 does not include a display.

The autonomous forklift and the remote control 400 include a wireless connection. The remote control 400 may communicate with the autonomous vehicle 15 on-board electronics such as the controller 22A and/or the local transceiver 90 via wireless technologies such as, without limitation, Wi-Fi, Bluetooth, and GPS. In an embodiment, the wireless connection is a radio frequency (RF) connection such as, but not limited to, a Wi-Fi connection. For example, the autonomous forklift controller 22A and the remote control 400 may each include an RF module or transceiver. However, other modes of wireless communication may be employed with the wireless connection. The AOS is operable to receive remote signals from the remote control 400 via wireless communication. In an embodiment, the wireless connection between the remote control 400 and the AOS enables the user to change guidance modes and monitor telemetry and sensor data in real-time. In an exemplary embodiment, the on-board vision system and depth camera(s) provide the user with visual feedback of the current autonomous forklift 15 environment and operating conditions. In an exemplary embodiment, real-time status information about the AOS and the processing unit is provided to the remote control 400 via the wireless connection.

As illustrated in FIGS. 7B-7C, in an exemplary embodiment, the remote control 400 provides a radio-frequency (RF) tether to the autonomous vehicle 15. For example, in the localized remote guidance mode, the autonomous vehicle 15 may follow a planned route 202, but the autonomous vehicle 15 will traverse the planned route 202 at a pace corresponding to the pace of the operator utilizing the remote control 400. In an embodiment, the remote control 400 includes controls such as, without limitation, "start," "stop," "follow," and "return to staging area." In an exemplary embodiment, the localized remote guidance mode does not provide an operator utilizing the remote control 400 control over actuation/translation of the forks 17. This limited control status serves as an additional safety measure. However, in another embodiment, the remote control 400 provides an operator utilizing the remote control 400 control over actuation/translation of the forks 17.

In an exemplary embodiment, the localized remote guidance mode provides for an automated hand-off of autonomous vehicles 15 to the remote control 400. For example, when a first vehicle 15a located at a load/unload/point (i.e., an operation zone/waypoint) is wirelessly connected with a remote control 400 and a second vehicle 15b approaches or enters the operation zone, the second vehicle 15b wirelessly connects with the remote control 400 and enters a passive/inactive state. In the passive state, the second vehicle 15 will not follow commands from the remote control 400; this ensures the remote control 400 is only operating one vehicle 15 at a time. Once the first vehicle 15a wirelessly disconnects from the remote control 400 (e.g., after receiving a signal to return to the material staging area), the second vehicle 15b enters an active state in which it will follow commands from the remote control 400.

In an exemplary embodiment, as illustrated in FIGS. 7A-7C, the localized remote guidance mode provides a human operator utilizing the remote control 400 the ability to navigate the vehicle 15 within a local route 204. In an embodiment, the local route 204 is limited by the planned route 202. In another embodiment, the local route 204 is unlimited by the planned route 202, and a vehicle 15 is operable to follow the remote control 400 through the installation area via the tether. The one or more flashing lights 50 described above can be utilized to communicate conditions of or detected by the vehicle 15 to a human operator.

In an embodiment, the automated guidance, localization guidance, yaw rate guidance, and localized remote guidance modes include preprogrammed acceleration and/or deceleration limits. In an exemplary embodiment, the acceleration and/or deceleration limits may be a function of environmental and/or terrain conditions. For example, an inclinometer, tilt sensor, accelerometer, etc. detecting the vehicle 15 navigating a decline, or to a stop on a decline, may provide a signal to the controller 22A triggering a protocol or command to increase the deceleration time period. Acceleration and deceleration may also be a function of the load 34 sensed mass. In an exemplary embodiment, the automated guidance, localization guidance, yaw rate guidance, and localized remote guidance modes include preprogrammed vehicle 15 speed limits. These limits may be the same in each guidance mode. In an exemplary embodiment, the speed limit of the vehicle 15 during the localized remote guidance mode is lower than the speed limit of the vehicle 15 during the automated guidance mode. Other operating limits of the vehicle may be programmed for each of the automated guidance, localization guidance, yaw rate guidance, and localized remote guidance modes.

While the AOS provides fully autonomous navigation and control of the autonomous forklift in the automated guidance mode, in an embodiment, the remote control 400 has the ability to override the processing unit guidance modes and take control of the AOS. Steering, throttling, and braking commands to the controller, along with guidance mode selections, may be input directly from the remote control 400, allowing the user to teleoperate the AOS.

In an embodiment, the AOS provides a hybrid automated guidance mode and localized remote control mode. For example, the forklift is operable in the fully autonomous navigation and control automated guidance mode to traverse an environment to a work crew; where the remote control 400 may be utilized to control movement of the forklift in the localized remote control guidance mode.

As described above, the pre-planned route for the AOS may be developed using a model-based design. This allows the processing unit to be rapidly modified and updated in a simulation environment/model before being autocoded directly to the on-board AOS. An advantage of model-based design is the ability to test the exact code that guides the AOS before operating in a real environment. In addition, model-based design allows for concurrent documentation and revision control of the processing unit.

As described above, the AOS is able to operate in a remote, GPS-denied environment while simultaneously mapping the environment. Perception/localization sensors identify and track features in the vicinity of the AOS. The perception sensor signals are utilized by the processing unit to create heading and path planning commands communicated to the controller for obstacle avoidance and navigation. The perception sensor data and/or processed information may be saved in the memory unit of the processing unit for relative navigation purposes. Should GPS data be available, GPS positioning of the autonomous forklift is also possible. However, many environments prevent GPS signal transmission.

Figure 8:
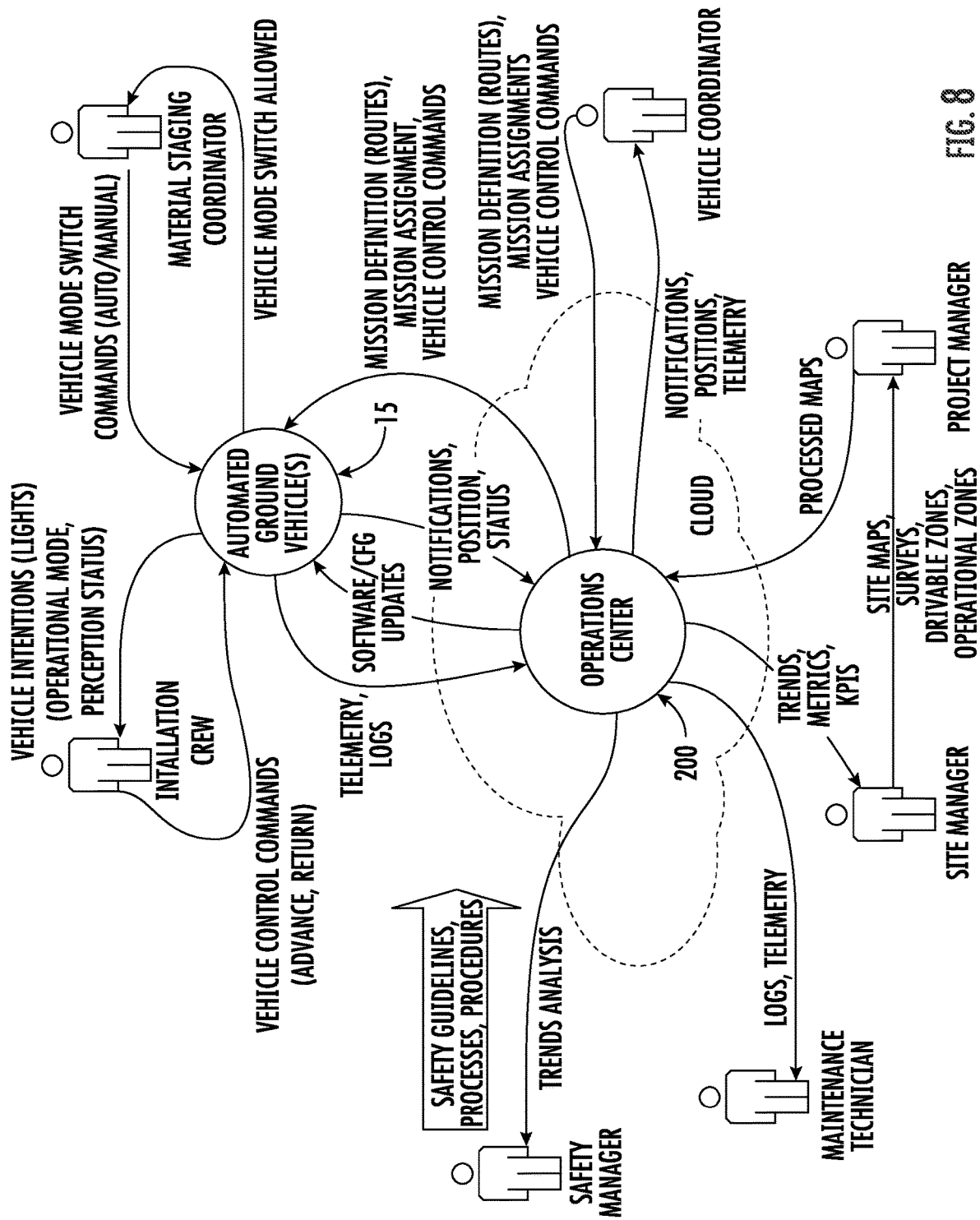
FIG. 8 shows a schematic of an autonomous vehicle control structure according to an embodiment of the present disclosure.

Referring now to FIGS. 7A-8, in an embodiment, the AOS includes the plurality of sensors 56, 58, 59, 60 located on each vehicle, a local controller 22A positioned on each vehicle operable to control navigation and actuation of the forks 17, and a remote centralized navigation controller 200. The remote centralized navigation controller 200 may also be referred to herein as a global controller. As illustrated in FIG. 7A, in an environment 300 such as a solar farm installation site, multiple vehicles 15 may navigate the environment 300 at the same time or in series. The centralized controller 200 includes a transceiver in communication with the global transceiver 92 of the local controller 22A of each vehicle 15 and the centralized controller 200 is operable to generate each vehicle route 202A, 202B, 202C for operating the vehicles 15 in the automated guidance mode. For example, the centralized controller 200 generates the vehicle routes 202A, 202B, 202C utilizing a site map, operational boundaries, hazard zones, and the real-time obstacle data generated by the plurality of sensors 56, 58, 59, 60 on each vehicle 15. The data acquired/transmitted by the sensors 56, 58, 59, 60 may be utilized to modify the vehicle routes 202A, 202B, 202C as well as operate the vehicles 15 in a localized guidance mode or obstacle avoidance mode (while following a route 202A, 202B, 202C). In an embodiment, the centralized controller 200 is operable to source satellite imagery utilized to determine reference points and operational boundaries. For example, the centralized controller 200 may source satellite imagery from a cloud service. In an exemplary embodiment, the centralized controller 200 is operable generate routes 202 in the automated guidance mode as a function of, or on the basis of, a field operator (e.g., a human operator or a crew) location. The centralized controller 200 is operable generate routes 202 in the automated guidance mode as a function of, or on the basis of, a signal from the field operator. For example, the field operator may utilize the remote control 400 to indicate to the centralized controller 200 that a load 34 of material is required at their location (e.g., via GPS data or latitude and longitude coordinates). In another example, the field operator may utilize a handheld transceiver to communicate to a staging area operator that a load 34 of material is required at their location (e.g., GPS data or latitude and longitude coordinates), and the staging area operator may provide this information to the centralized controller 200 (e.g., enter the field operator location into route planning/generating software of the centralized controller 200).

As illustrated in FIG. 8, in an embodiment, the centralized controller 200 stores planned route 202 data in the cloud, where each vehicle 15 is operable to access navigation instructions. Similarly, the centralized controller 200 may store data such as, without limitation, telemetry, vehicle 15 position status, vehicle 15 route 202 assignments, vehicle 15 control commands, crew location, environment maps, maintenance logs, and vehicle 15 safety analysis in the cloud.

A peer-to-peer architecture may also be utilized to communicate data acquired by the sensors 56, 58, 59, 60 between vehicles 15. The peer-to-peer architecture may be utilized by the vehicles 15 to ensure a standardized obstacle avoidance response on planned routes 202A, 202B, 202C. Additionally, the peer-to-peer architecture may be utilized to balance processing loads of individual vehicles 15.

In an exemplary embodiment, the centralized controller 200 communicates with a material handler (e.g., an automated handler or human operator) in a material staging area a designated pay load 34 to be loaded onto the automated vehicle 15. For example, the controller 200 may send a signal to the material handler to load a vehicle 15 with a designated pallet (e.g., pallet no. xxx), and the material handler will direct the vehicle 15 to the staging area exit (e.g., via a remote control 400). In an exemplary embodiment, the material handler is a human operator with a remote machine controller in wireless or wired connection with the vehicle 15. For example, the machine controller may include one or more joysticks and user inputs operable to drive and control the position and fork 17 translation of the vehicle 15. The centralized controller 200 then communicates a signal to the vehicle 15 to traverse a planned route 202A, 202B, 202C to and through an installation area. When the vehicle 15 autonomously traversing a planned route 202A, 202B, 202C reaches a waypoint designated in the planned route 202A, 202B, 202C, the vehicle 15 pauses its traverse to enable a work crew to unload, and in some situations install, the payload 34. Receiving a signal from one of the on-board sensors or a member of the work crew that indicates the payload 34 is unloaded, and in some situations installed, the vehicle 15 continues to traverse the planned route 202A, 202B, 202C through the installation area back to the material staging area.

In an exemplary embodiment, the vehicle controller 22A is operable distinguish the remote control 400 from the machine controller, and the controller 22A is configured to grant the machine controller greater operating freedom (i.e., control) of the vehicle 15. In an embodiment, the controller 22A is operable to distinguish the remote control 400 from the machine controller via the location coordinates (e.g., GPS data) of the remote control 400) and the machine controller.

One or more vehicles 15 may also be operated in a localized remote guidance mode in which the one or more vehicles 15 follows a work crew or individual thereof at or about a waypoint in the installation area. In an embodiment, the RF beacon 60 and/or the controller 22A of the vehicle 15 is in communication with a radio transponder (e.g., remote control 400) carried by the work crew. For example, the radio transponder and RF beacon 60/controller 22A may operate as a tether, facilitating incremental movement of the vehicle 15 as a work crew advances through a work site or a portion thereof. In an embodiment, at least one member of a work crew may carry a remote control 400. When the payload 34 is unloaded, and in some situations installed, the remote control 400 may be utilized to signal the vehicle 15 to continue to traverse the planned route 202A, 202B, 202C back to the material staging area. As illustrated in FIG. 9B, in an embodiment, the remote control 400 includes two user inputs 402, 404. For example, a first user input 402 may be a depressible button in the shape of an arrow pointing in a first direction (e.g., a horizontal direction), and the second user input 404 may be a depressible button in the shape of a house. Depression of the first button 402 (e.g., for the duration of one second) will signal the vehicle 15 to advance a set distance (e.g., 3 meters) along the planned route 202A, 202B, 202C. Depression of the second button 404 (e.g., for the duration of one second) will signal the vehicle 15 to advance along the planned route 202A, 202B, 202C to the material staging area.

In an embodiment, the vehicle 15 and AOS are operable to continuously log signals from the sensors 56, 58, 59, 60 or log signals from the sensors 56, 58, 59, 60 when triggered by a pre-defined condition or set of conditions. The signals and or logged signals from the sensors 56, 58, 59, 60 may also be streamed to the centralized controller 200. The vehicle AOS may further flag or notify the centralized controller 200 of obstacles, route blockages, and/or sensor faults. The vehicle 15 and AOS is also operable to perform a self-check before operating in an autonomous guidance mode such as the Automated guidance mode or localized guidance mode.

In an embodiment, the vehicle controller 22A is operable to provide load management. For example, during autonomous or manual navigation of the vehicle 15 the forks 17 may be tilted or raised by one or more of the actuators 20, 21 to balance the carried payload. The forks 17 may tilt/raise based on the orientation in which the vehicle 15 is driving (e.g., backwards/forwards).

In an embodiment, the autonomous vehicle 15 and the AOS may be utilized in subterranean environments. For example, in mining and tunneling operations GPS signals are blocked by soil and sediment. The AOS Localization Guidance mode enables automated navigation of equipment without GPS signals.

In an embodiment, the autonomous vehicle 15 and the AOS may be utilized in military environments. For example, in conflict zones GPS signals may be jammed. The AOS Localization Guidance mode enables automated navigation of equipment transports, scout vehicles, and medical extraction vehicles without GPS signals.

In an embodiment, the autonomous vehicle 15 and the AOS may be utilized in aquatic environments. For example, in subsea environments GPS signals may be blocked or limited by the water. The AOS Localization Guidance mode enables automated navigation of submersibles for, without limitation, inspection and/or maintenance of oil and gas pipelines.

It would be understood by one of ordinary skill in the art that the autonomous vehicle 15 has industrial, military, agricultural, and aerospace applications. In an example, the autonomous vehicle 15 may comprise a mobile crane. In an example, the autonomous vehicle 15 may comprise an excavator having a boom arranged over the vehicle's center of gravity. In an example, the autonomous vehicle 15 may comprise a combat vehicle (e.g., self-propelled artillery, self-propelled air defense system, etc.) having a turret arranged over the vehicle's center of gravity.

The autonomous vehicle 15 and the AOS provide a number of advantages. For example, the autonomous forklift AOS provides mechanisms and systems to consistently make accurate feature distance and location calculations despite the fact that obstacles (e.g., debris or people) can interfere with an ultrasonic measurement of the feature distance. Further, the autonomous vehicle 15 can provide accurate navigation even in dusty, GPS limited/denied, and unpredictable environment.

It should be appreciated that certain features of the system, which are, for clarity, described in the context of separate embodiments, may also be provided in combination in a single embodiment. Conversely, various features, which are, for brevity, described in the context of a single embodiment, may also be provided separately or in any suitable combination. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An autonomous vehicle and navigation system, comprising:
   a chassis;
   a propulsor arranged to drive said chassis, wherein said propulsor is operably connected with an electric power source;
   a load bearing dynamic platform operable to translate vertically; and
   a controller operable to receive and transmit signals, wherein said controller is operable to control said propulsor;
   wherein said controller is operable to navigate an environment utilizing one or more pre-planned routes in an automated guidance mode as a function of guidance from a global controller; and
   wherein said controller is operable to navigate said environment utilizing signals from a remote control in a localized remote guidance mode.

2. The autonomous vehicle and navigation system according to claim 1, further comprising a load bearing static platform operable to support a payload.

3. The autonomous vehicle and navigation system according to claim 1, wherein said load bearing dynamic platform is operable to arrange a load substantially at a center of gravity of said vehicle.

4. The autonomous vehicle and navigation system according to claim 1, further comprising a global positioning satellite receiver electrically connected with said controller, wherein said controller is operable to navigate said environment utilizing signals from said global positioning satellite receiver in said automated guidance mode.

5. The autonomous vehicle and navigation system according to claim 1, further comprising a mast connected with said chassis, wherein said load bearing dynamic platform is connected with said mast and said mast is operable to translate horizontally relative to said chassis, whereby said load bearing dynamic platform is operable to translate in two dimensions.

6. The autonomous vehicle and navigation system according to claim 1, wherein said guidance comprises at least one of a planned route or a signal transmitted from said global controller.

7. The autonomous vehicle and navigation system according to claim 1, wherein said remote control is operable to transmit a signal to said controller to advance said vehicle a predetermined distance along said pre-planned route and/or to advance said vehicle along said pre-planned route to a starting area.

8. The autonomous vehicle and navigation system according to claim 1, further comprising a plurality of perception sensors operable to transmit a signal to said controller, wherein said plurality of perception sensors are operable to detect environmental features, and wherein at least one of said automated guidance mode and said localized remote guidance mode comprises signals from said plurality of perception sensors.

9. The autonomous vehicle and navigation system according to claim 1, wherein said automated guidance mode comprises routes generated via said global controller as a function of at least one of a field operator location, a signal from a field operator, a site map, operational boundaries, hazard zones, and real-time obstacle data generated by a plurality of vehicle perception sensors.

10. The autonomous vehicle and navigation system according to claim 2, wherein said load bearing static platform comprises two panels arranged over said chassis and a gap therein and wherein a mast connected with said load bearing dynamic platform is operable to translate horizontally in said gap.

11. The autonomous vehicle and navigation system according to claim 1, wherein said load bearing dynamic platform is connected with a mast and said load bearing dynamic platform is operable to translate vertically relative to said mast.

12. An autonomous vehicle and navigation system, comprising:
    a chassis, wherein said chassis is free of an operator cabin;
    a propulsor arranged to drive said chassis, wherein said propulsor is operably connected with an electric power source;
    a load bearing static platform operable to support a payload arranged substantially at a center of gravity of said vehicle, wherein said load bearing static platform defines a space therein;
    a mast connected with said chassis, wherein said mast is arranged within said space;
    a load bearing dynamic platform connected with said mast, wherein said load bearing dynamic platform is operable to translate vertically relative to said mast; and
    a controller operable to receive and transmit signals, wherein said controller is operable to control said propulsor and translation of said load bearing dynamic platform;
    wherein said mast is configured to translate within said space, whereby said load bearing dynamic platform is configured to translate in two directions relative to said chassis.

13. The autonomous vehicle and navigation system according to claim 12, further comprising a horizontal translation actuator configured to horizontally translate said mast and wherein said horizontal translation actuator includes a lead screw operably driven via an electric motor.

14. The autonomous vehicle and navigation system according to claim 12, further comprising a sensing bumper.

15. An autonomous vehicle and navigation system, comprising:
    a propulsor operably connected with an electric power source; and
    a controller operable to receive and transmit signals, wherein said controller is operable to control said propulsor;
    wherein said controller is operable to navigate an environment utilizing one or more pre-planned routes in an automated guidance mode as a function of guidance from a global controller;
    wherein said controller is operable to navigate said environment in a localized remote guidance mode as a function of signals from a remote control;
    wherein said controller is operable to change between said automated guidance mode and said localized remote guidance mode.

16. The autonomous vehicle and navigation system according to claim 15, wherein said remote control is in wireless communication with said controller and includes a wireless tether to said vehicle.

17. The autonomous vehicle and navigation system according to claim 16, further comprising a wireless communication system electrically connected with said controller and wherein said wireless communication system comprises a radio frequency transmitter and a radio frequency receiver in signal communication with said remote control.

18. The autonomous vehicle and navigation system according to claim 15, wherein said remote control is operable to change a navigation mode of said controller between said automated guidance mode and said localized remote guidance mode.

19. The autonomous vehicle and navigation system according to claim 15, further comprising a global positioning satellite receiver electrically connected with said controller and wherein said controller is operable to navigate an environment utilizing signals from said global positioning satellite receiver in said automated guidance mode.

20. The autonomous vehicle and navigation system according to claim 15, wherein said guidance comprises at least one of a planned route or a signal transmitted from said global controller.

21. The autonomous vehicle and navigation system according to claim 15, further comprising a plurality of perception sensors operable to transmit a signal to said controller, wherein said controller is operable to navigate said environment utilizing signals from said plurality of perception sensors in a localization guidance mode.

22. The autonomous vehicle and navigation system according to claim 15, wherein said automated guidance mode comprises routes generated via said global controller as a function of at least one of a field operator location, a signal from a field operator, a site map, operational boundaries, hazard zones, and real-time obstacle data generated by a plurality of vehicle perception sensors.

\* \* \* \* \*